United States Patent
Clausi et al.

(10) Patent No.: US 7,646,914 B2
(45) Date of Patent: Jan. 12, 2010

(54) SYSTEM AND METHOD FOR COLLECTING AND ANALYZING EVENT DATA

(76) Inventors: David Anthony Clausi, 534 Leighland Drive, Waterloo, Ontario (CA) N2T 2H3; Justin Alexander Eichel, 300 Kenneth Ave., Kitchener, Ontario (CA) N2A 1W6; Wen Xin Zhang, 939 Forestwood Drive, Mississauga, Ontario (CA) L5C 1G9; Craig Michael Rathe, 177 Woolverton Road, RR#1, Grimsby, Ontario (CA) L3M 4E7

( * ) Notice: Subject to any disclaimer, the term of this patent is extended or adjusted under 35 U.S.C. 154(b) by 770 days.

(21) Appl. No.: 11/453,009

(22) Filed: Jun. 15, 2006

(65) Prior Publication Data

US 2007/0300157 A1    Dec. 27, 2007

(51) Int. Cl.
*G06K 9/00* (2006.01)
*G06K 9/22* (2006.01)

(52) U.S. Cl. ........................ 382/187; 382/313
(58) Field of Classification Search ............... 382/187, 382/313, 314; 345/157, 169, 179
See application file for complete search history.

(56) References Cited

U.S. PATENT DOCUMENTS

| | | | | |
|---|---|---|---|---|
| 5,412,188 A * | 5/1995 | Metz | ........................ | 235/375 |
| 5,636,920 A * | 6/1997 | Shur et al. | ........................ | 700/91 |
| 5,923,365 A * | 7/1999 | Tamir et al. | ........................ | 348/169 |
| 6,122,559 A * | 9/2000 | Bohn | ........................ | 700/91 |
| 6,545,689 B1 * | 4/2003 | Tunli | ........................ | 715/719 |
| 7,548,565 B2 * | 6/2009 | Sull et al. | ........................ | 370/503 |

* cited by examiner

*Primary Examiner*—Daniel G Mariam

(57) ABSTRACT

A computer-based system is disclosed for the gathering and analysis of data and planning associated with that data captured during or related to events. The system is based on existing core technology that allows for the use of a digital pen land marked with respect to some spatial location on the surface of a computer screen that allows storage of ink data and allows for interpretation of handwritten characters. A mouse can be used in place of the digital pen, however, it is advantageous to use the digital pen on the surface of a computer screen. Part of the invention is able to capture real-time data in dynamic environments where the user must maintain active contact with the scene, allowing only minimal viewing of the computer screen. This minimal viewing component can be applied to, but not limited to, polling, traffic analysis, and sporting events. For the application to team sporting events, the minimal viewing component provides an efficient means for personnel to enter game statistics in real-time. The complete system also provides a means of, but is not limited to, generating team and player statistics across a selection of seasons, games or groups of games; capturing both spatial and temporal events; synchronizing digital video with event actions; analyzing contributions of groups of players based on game statistics; maintaining detailed scouting information on a plurality of teams; maintaining detailed scouting and recruiting information on a plurality of individual personnel; channeling a plurality of selected subsets of data; storing a plurality of game plays (formatted and unformatted); preparing and displaying data associated with a league containing multiple teams; and enabling strategic decisions (drills, practices, schedules, goal setting).

20 Claims, 32 Drawing Sheets

Fig. 4a

| <Team Name> | <Team Category> | <Season> |
|---|---|---|

ROSTER (40)

| TEAM PLAYERS | | | | TEAM STAFF | |
|---|---|---|---|---|---|
| # | Name | Position | Height | Name | Title |
| ... | | | | ... | |

(108)　　　　　　　　　　(110)

(71)　(66)

TEAM SCOUT (44)

Offense
•

Transition
•

Defence
•

Miscellaneous
•

| PRACTICE | |
|---|---|
| Date: Jan 15, 2005    Start 2:00pm  End: 4:00pm   (76) | |
| Objectives: During this practice, the team focus will be on … | |

DRILLS (72)

| Name ▼ | Type ▼ | Specific ▼ | Duration ▼ | Players |
|---|---|---|---|---|
| 3pt Shooter | Offense | Shooting | 15 | 4-6 |
| Footwork | Defense | One-on-one | 10 | 2-4 |
| PostPlay | Offense | One-on-one | 12 | 2-6 |
| … | | | | |

PRACTICE ITINERARY (78)

| Time | Drill | Coach | Group |
|---|---|---|---|
| 2:00-2:10 | Warmup | Jones | All |
| 2:10-2:25 | Footwork | Michaels | Guards |
| … | | | |

TEAM PLAYERS (108)

| Attend | Name | Scrimmage |
|---|---|---|
| ⊗ | Smith, Bob | A |
| ⊗ | Green, Joey | B |
| ⊗ | Fulton, Jerry | B |
| | … | |

PRACTICE BREAKDOWN (82)

| Types | | Specific | |
|---|---|---|---|
| Offense | 32% | Passing | 12% |
| Defense | 20% | Shooting | 17% |
| Warmup | 5% | One-on-one | 9% |
| … | | … | |

Statistics for last [ 5 ] games.

Fig. 4d

| Drills Facility | | | | | |
|---|---|---|---|---|---|
| Name | Type | Specific | Duration | Players | Date |
| 3pt Shooter | Offense | Shooting | 15 | 4-6 | July 5, 2005 |
| *Footwork* | *Defense* | *One-on-one* | *10* | *2-4* | *Aug 10, 2005* |
| PostPlay | Offense | One-on-one | 12 | 2-6 | July 30, 2005 |
| ... | | | | | |

(72)

Description (74)

Footwork1 Description

Footwork1 Instruction

| League: Mythological Basketball League | Season: 2004-2005 | Schedule |

Standings (84)

| North Conference | | |
|---|---|---|
| | W | L |
| Team Zeus | 10 | 4 |
| Team Mercury | 9 | 5 |
| ... | | |

| South Conference | | |
|---|---|---|
| | W | L |
| Team Athena | 10 | 4 |
| Team Icarus | 9 | 5 |
| ... | | |

| Central Conference | | |
|---|---|---|
| | W | L |
| Team Mars | 10 | 4 |
| Team Pegasus | 9 | 5 |
| ... | | |

[ Add Team ]  [ Delete Team ]

Player Leaders (86)

| Action ▼ | Conference ▼ | Position ▼ |
|---|---|---|
| 3pt | All | Guards |

Fig. 8

SYSTEM AND METHOD FOR COLLECTING AND ANALYZING EVENT DATA

This application claims priority to U.S. Provisional Patent Application No. 60/690,490, filed Jun. 15, 2006, the entire contents of which are incorporated herein by reference.

FIELD OF THE INVENTION

The present invention relates to systems and methods for gathering and analyzing data captured during or related to live or prerecorded events. This invention further relates to systems and methods for optimizing human/computer interactions for real time data gathering and analysis captured during or related to live or prerecorded events.

BACKGROUND OF THE INVENTION

Systems and methods for gathering and analyzing data captured during or related to live prerecorded events are known. In particular, systems and methods are known that enable play-by-play analysis of live or prerecorded game events for analysis thereof.

For example, various electronic devices are known for enabling individuals to track game events. Many of these systems require dedicated hardware components. More recently, technological advancements have provided the use of programmed personal computers to improve product flexibility and reduce production costs.

Systems that require dedicated hardware for tracking of game events include the following:

U.S. Pat. No. 6,148,242 is a portable electronic device used for recording and utilizing basketball game data. This device is dedicated to basketball only and is limited to a total of four rosters, 15 players per roster and 24 games. Thumb-operable keys are used to activate data entry of basketball game events.

U.S. Pat. No. 6,122,559 is a dedicated hand-held computer used for inputting sporting data, with an emphasis on the sport of soccer. Events (such as scoring and penalties) are associated with a player number and stored so that compiled statistics can be obtained.

U.S. Pat. No. 6,041,266 is a device that allows entry of baseball game statistics using a dedicated computer and keyboard for data entry.

U.S. Pat. No. 5,377,982 is a portable electronic scorekeeping device used to store statistics captured during a baseball game. Data is entered via a keyboard and is viewed on multiple displays. The device includes a microprocessor for data compilation, a printer to generate hardcopies, and an interface to a public scoreboard.

U.S. Pat. No. 4,266,214 describes a portable electronic game scoring apparatus. Although scoring is provided, no means of storing or generating statistics is provided.

Systems that operate using a personal computer to track game events include the following:

U.S. Pat. No. 6,545,689 represents a method and system for reviewing, editing, and analyzing soccer video data in support of gathering statistical information. This system is implemented on a personal computer running a Windows 98 (or equivalent) operating system and buttons are selected using a mouse.

U.S. Pat. No. 5,412,188 is a sports statistic recording system that utilizes bar code charts, a scanning device, and a computer. The computer is programmed to associate certain bar codes with specific players or events. This system requires significant setup time and does not lend itself well to real-time tracking.

U.S. Pat. No. 6,795,638 describes a system and method for creating video clips of activities that occur during hockey games, as well as other live performances. A database is used to store the video clips that are associated with selected events occurring during the game.

Other related inventions include those that are used primarily for tracking rosters, instead of tracking game events. For example, U.S. Pat. No. 5,636,920 discloses a sports team organizer that includes a dedicated hand-held device that is programmed to provide means for entering a roster and then calculating a optimal line-up based on user-defined enumerated ratings. U.S. Pat. No. 5,653,634 is a device used to store bibliographical and statistical information on individual players.

There is a need for a system and method in the field of team sports to keep track, on an ongoing and season-to-season basis, of many different aspects including, but not limited to creating rosters, evaluating players, diagramming plays, creating playbooks, recruiting personnel, scouting players and team, capturing game events in real-time, synchronizing game events with video, preparing for games, performing statistical analysis, storing drills, planning practices, generating a graphical play-by-play of actions, tracking leagues, and scheduling seasons. The prior art solutions do not provide these different aspects, nor do they disclose means for integrating these aspects in an easy to use application.

Another disadvantage of the prior art solutions, including those described above, is that they tend to be inefficient in that they do not optimize the number of users required to capture actions regarding the live or prerecorded event in real time.

There is a further need for a system and method that meets the aforesaid requirements that has improved characteristics for capturing spatial and/or temporal characteristics of the live or prerecorded events and optionally synchronizing these characteristics with digital video. In particular, the prior art solutions do not present means for efficient capture of the relatively complex set of temporal and/or spatial events associated with many live or prerecorded events that involve a rapidly running sequence of scenes, which can occur in disparate physical locations.

SUMMARY OF THE INVENTION

In one aspect of the present invention, a portable digital system is provided that is operable to enable a user to enter data related to a relatively rapid sequence of scenes, including their time and/or space attributes, without the need for the user to maintain a visual connection with the graphical user interface (GUI).

In another aspect of the present invention, the portable digital system is further operable to integrate various data entry modules through a common database, and is further operable to generate, based on such common database, statistics that support a series of processes associated with a particular event. In a particular aspect of the present invention the statistics generated in a sports embodiment of the present invention enable users to engage in a range of associated activities that include, but are not limited to: creating rosters, evaluating players, diagramming plays, recruiting personnel, scouting players and teams, capturing game events in real-time, synchronizing game events with video, preparing for games, performing statistical analysis, storing drills, planning practices, generating a graphical play-by-play of actions, tracking leagues, and scheduling seasons.

In another aspect of the present invention, a GUI is disclosed that provides a novel environment for planning and strategizing.

In a preferred embodiment thereof, the portable digital system of the present invention includes a tablet computer linked to a digital pen, and the computer application of the present invention loaded on the tablet computer. The computer application supports a series of GUIs provided on the tablet computer, and further the computer application deploys a series of processes on the tablet computer that are associated with the GUIs, that in combination enable a user of the tablet computer to in real-time simultaneously and seamlessly capture spatial and/or temporal characteristics of the scenes involved in a live or prerecorded event, including their time and/or space attributes such that: (a) capture of subsets of scenes is possible without substantial loss of generality; (b) a minimal number of users can capture substantially all statistics associated with the event in real-time. A particular aspect of the invention is that the system allows users (once familiar with the disclosed technology) to utilize the system functions by landmarking on the tablet screen by quickly glancing or using peripheral vision in order to enter, with the digital pen, codes involving symbols, letters, and/or numbers at particular spatial locations. This allows the user to maintain visual contact with dynamic events while recording associated actions into the tablet computer. This particular aspect is referred to as a Minimal Glance System (MGS).

BRIEF DESCRIPTION OF THE DRAWINGS

A detailed description of the preferred embodiment(s) is (are) provided herein below by way of example only and with reference to the following drawings, in which:

FIG. 4a is a representation of a particular embodiment of a GUI for the Roster and Team Scouting facilities of the TEAM environment of the computer program of the present invention, in one particular embodiment thereof.

FIG. 4d is a representation of a particular embodiment of a GUI for the Practices facility of the TEAM environment of the computer program of the present invention, in a particular embodiment thereof.

FIG. 8 is a representation of a particular embodiment of a GUI for the League facility of the computer program of the present invention, in a particular embodiment thereof.

FIG. 9l is a further workflow diagram illustrating a user creating or modifying a league.

Figure 1:
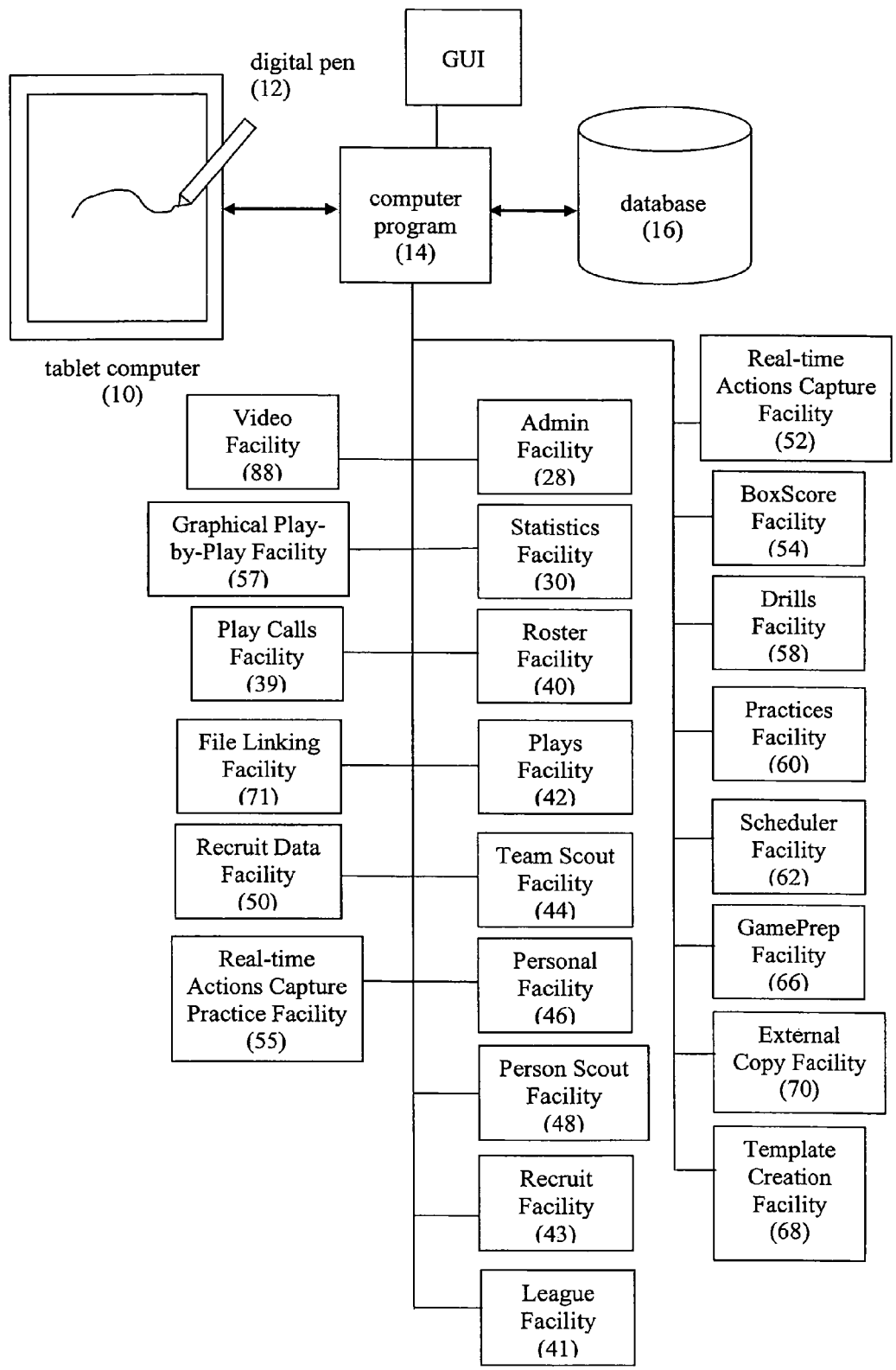
FIG. 1 is a system diagram illustrating the principal resources of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 is a system diagram illustrating the principal resources of the present invention, in one embodiment thereof. The preferred embodiment of the present invention includes a tablet personal computer or tablet computer (10). The tablet computer is an appropriate embodiment since it is portable, is able to capture ink data, and is able to perform handwriting recognition. The tablet computer (10) is linked to a known digital pen (12) which acts as an input device to the tablet computer (10) as particularized herein. The computer program (14) of the present invention is loaded on the tablet computer (10). The tablet computer (10) and digital pen (12) together are operable to deliver handwriting recognition functionality. For example, in one particular embodiment of the invention, the computer program (14) interfaces with a known computer application linked to the digital pen (12) to provide digital processing of marks made by a user holding the digital pen (12), and to perform handwriting recognition. A specific example of a possible implementation includes the use of base functionality associated with recording and interpreting digital ink as provided by the MICROSOFT® software developer kit (SDK) that supports tablet computers. Handwriting recognition functionality is also provided through functionality included in the MICROSOFT® SDK that supports tablet computers. The computer program (14) interfaces with a database (16), where a database (16) is defined in the usual accepted technical fashion. The database (16) contains tables that store data that can be retrieved by other facilities in order to perform tasks required by the user.

It should be understood that the practice of the present invention is not limited to the use of a tablet computer, rather the invention contemplates the use of any digital processing system that is linked to an input device operable to digitize input provided by a user with the speed required in the events that include a relatively rapid sequence of scenes as described in this disclosure.

It should be understood that "scenes" or a "scene" in this disclosure refer to a visually perceived, relatively discrete event that is part of a larger event. Examples of a scene include a particular pass in a basketball game, a pitch in a baseball game, a particular type of vehicle entering a particular area in a traffic scene, and so on. Each scene therefore also relates to a particular action of interest in a sequence of actions that are part of an "event" (where an event is defined in this disclosure as the basketball game, the baseball game, the traffic scene and so on). In accordance with this invention, data regarding these various actions are captured by reference to the actual scenes based on a viewing of the event. It should be understood that the term "action" is used in contrast from the larger "event", but in fact an individual "action" can be made up of a series of actions represented by a particular action defined by the invention. For example, a "pass" actually involves one player throwing a ball, and another player catching the ball, nonetheless it can constitute a single "action" for the purposes of recording the various scenes that are part of the larger event. A user is defined in this patent as a person who will use the described invention. In general, the user is anybody who will directly use the invention. In the particular aspect of the present invention in a sports embodiment, a user is defined as any person involved with managing or monitoring the team, either in its own regard or as part of a league. As such, the user is defined as, but is not limited to, any player, staff, manager, scout, coach, or fan with an interest in assessing or monitoring a league, team, or player.

Based on currently technology, a system including a digital pen (12) combined with handwriting recognition technology and recording of digital ink is preferred for its speed, relatively broad acceptance, its usability and cost advantages. Other implementations based on the invention and utilizing alternative technologies are possible. For example, the functionality provided by the digital pen (12) can also be provided by a standard computer mouse, but this is restrictive in terms of actions such as handwriting recognition and recording of actions that are part of a particular event, as particularized below.

The computer program (14) described in the present invention, in its various specific embodiments, includes the various functions particularized in this disclosure. The computer program (14) is readily programmed by skilled programmers, including for example in the VisualBasic® programming language. The present invention should not be read to limit the invention to any particular implementation of the computer program (14), whether as to program structure, overall architecture, related GUIs or otherwise, but rather to extend to a computer program that includes one or more of the functions as claimed and described herein.

Figure 2A:
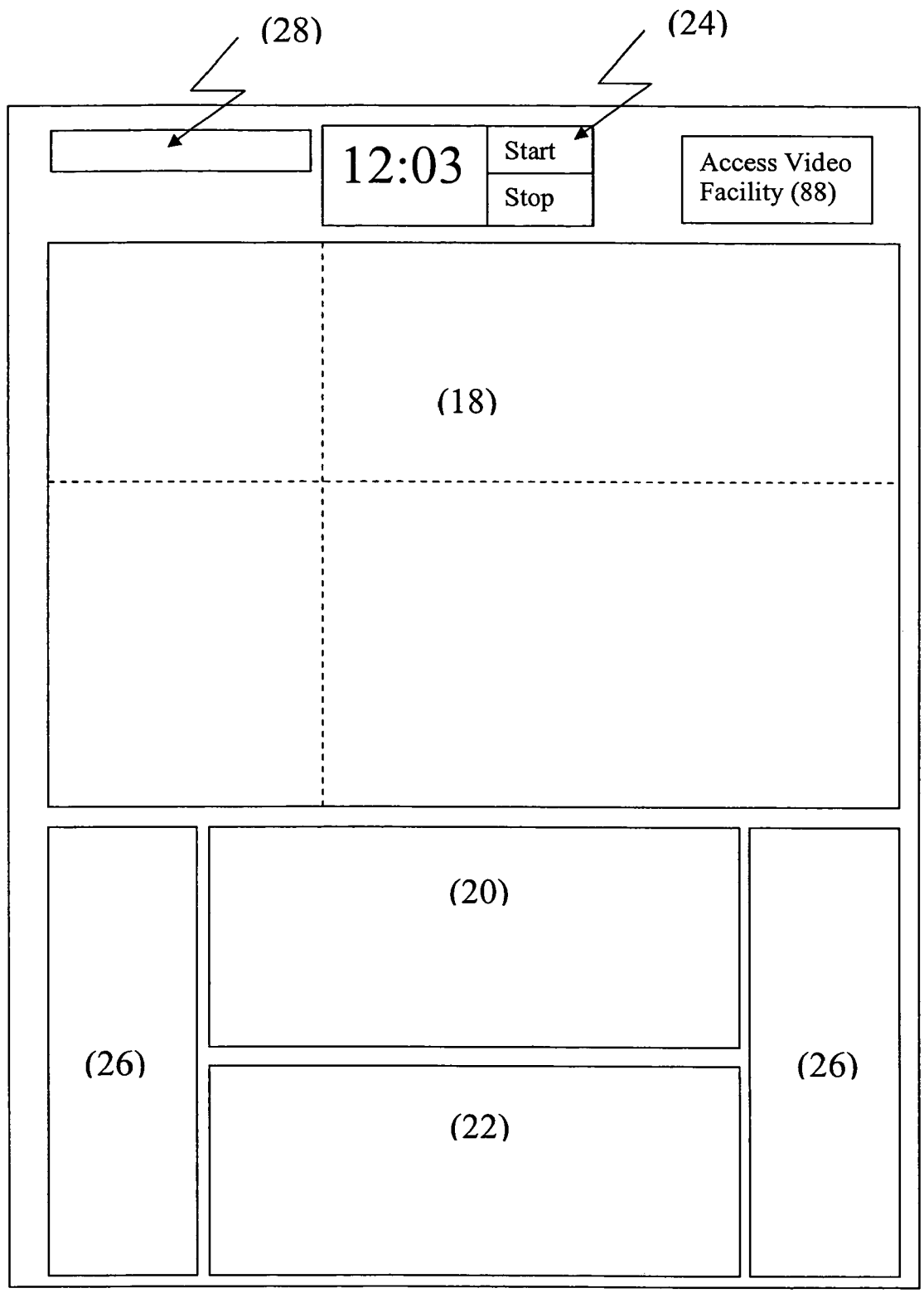
FIG. 2a illustrates a representative interface, provided in accordance with the present invention, for real-time data entry, and viewing thereof.
Figure 2B:
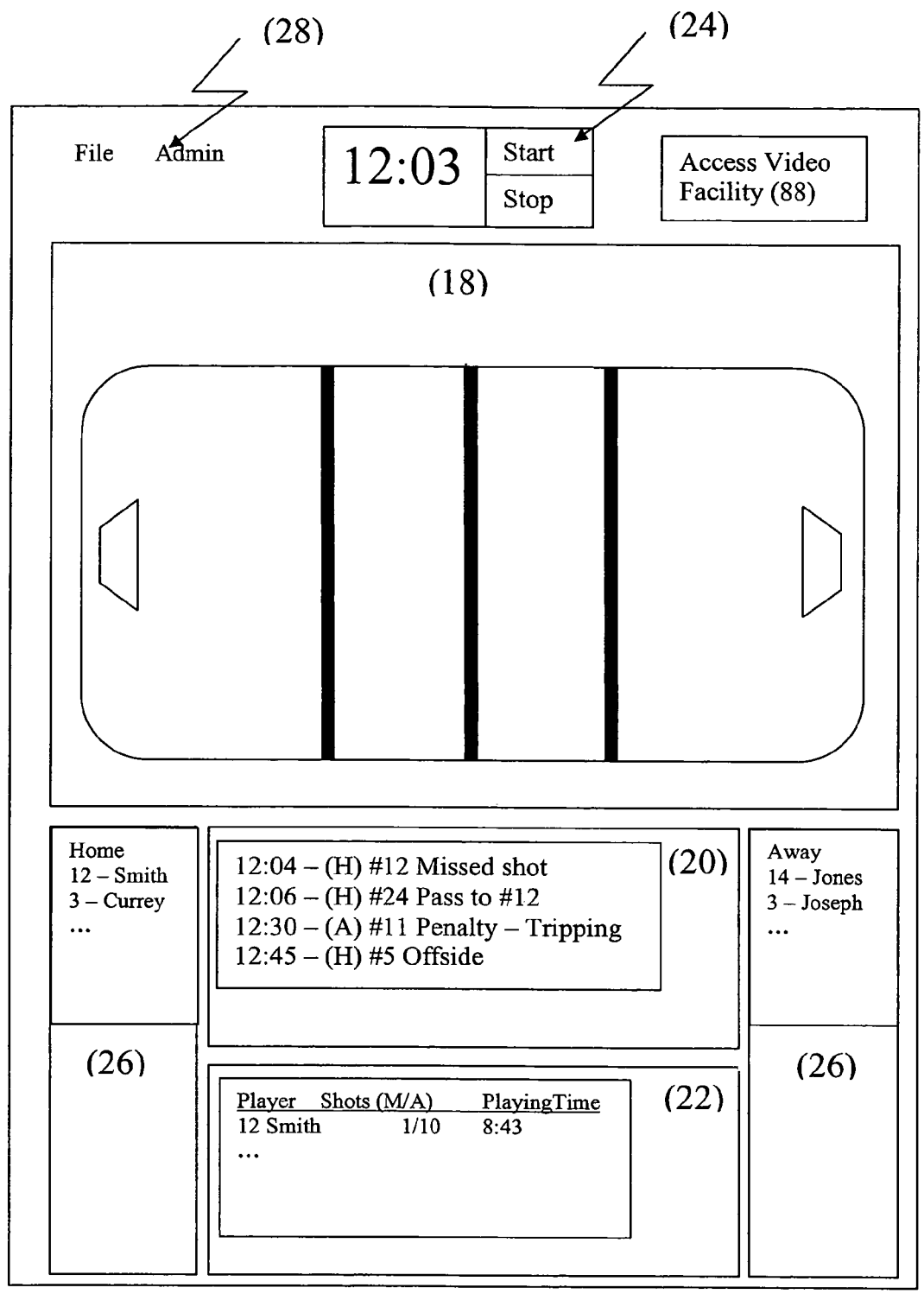
FIG. 2b represents the interface shown in FIG. 2a, but applied to the game of hockey, in a particular embodiment of the present invention.

FIG. 2a shows a representative embodiment of a GUI provided in accordance with the present invention for rapid, minimal glance data entry. The key aspect of this interface is the area indicated by the coded data entry area (18). The coded data entry area (18) preferably provides adequate space on the screen of the tablet computer (10) to allow for coded data (also referred to as "codes") entry by the user, as particularized in this disclosure. The coded data entry area (18) can be subdivided into other discrete areas, depending on the application. Typically, the coded data entry area (18) includes application dependent landmarks to allow the user to easily select certain spatial locations for data entry, where the actions captured depend on spatial parameters. These spatial parameters are explained by reference to particular embodiments below. For example, one particular landmark is the playing field landmark (18) illustrated in FIGS. 2b and 7 as particularized below.

The coded data is best understood as a short form symbol of particular actions or combinations of actions and associated attributes (such as space and/or time). These are assigned by operation of the administration facility (28) as further particularized below.

As explained above, the computer program (14) includes or is linked to handwriting recognition functionality. The computer program (14) is operable to interpret entry of the coded data as handwritten symbols marked in the coded data entry area (18). By allowing the use of handwritten codes entered into relatively large areas on the data entry screen (or a functional equivalent) with proper landmarking, the user is not required to stare at the data entry screen when observing any scene and entering data based on that scene. As long as the user is able to glance at the screen and properly landmark the desired location, the user is expected to be able to enter descriptive codes properly since the user will be able to view multiple sequential scenes and enter codes at the same time. In other words, the present invention enables a user to record actions as they relate to a dynamic event.

The codes consist of any suitable implementation of short form, including in the preferred embodiment sequences of letters and/or numbers, and/or symbols, and/or drawing strokes. These sequences in turn represent a specific coding and the interpretation of the sequence corresponds to an observed action. The user enters handwritten codes, which are subsequently interpreted by the computer program (14) of the present invention. The entering of a coded event in a particular sub-area of the coded data entry area (18) can generate a different interpretation. In this way, parallel sequences of actions can be recorded in two separate areas. The sub-areas might be used to, but not limited to, track multiple different scenes of the same type (e.g. two or more traffic intersections) or may be used to capture different types of information from the same scene (e.g. 2 point versus 3 point shot attempts in basketball) or perhaps a combination of both.

In accordance with a particular aspect of the present invention, in order to maintain a readable appearance of the coded data entry area (18), the coded data entry area (18) is provided such that a maximum number of codes appear in the coded data entry area (18) at any given time by automatically deleting the oldest coded data entry. For example, the computer program (14) may only require that the last five actions entered remain visible in the coded data entry area. When a new event is entered, the oldest action is removed from the queue, maintaining only five visible data entries. These parameters can be modified by operation of the administration facility (28) further particularized below.

The codes can either be preprogrammed by the software designer or the software designer can allow the user to select their own codes for the events of their choosing, by operation of the administration facility (28). The administration facility (28) is best understood as a known WINDOWS® utility that enables a user, or possibly in certain implementations an administrative user only, to set a plurality of variables regarding the operation and use of the computer program (14) of the present invention. These include: defining the statistics of interest and how these will be processed by operation of the statistics facility (30) referred to below; deciding the length of the display queue; assigning permissions for individuals to access and/or modify certain parts of the database content; and selecting of codes and their associated actions.

The computer program (14) is operable to interpret the handwritten data entries to define a log of actions. The interpretation of the codes appears in an action log (20) as shown in FIG. 2a. As an example, the various identified actions can be displayed on a row-by-row sequential basis, where the last item entered appears at the top of the list and the most dated event is removed from the list. All actions can be stored in a computer database (16).

By operation of the statistics facility (30), statistics can be generated dynamically by parsing the logged actions and the statistics would appear in the statistics area shown in FIG. 2a (22).

In most applications, the tracking of actions by operation of the present invention depends on the relative timing of such actions in a timeline. The computer program (14) therefore is operable to associate each action with a particular time by operation of a clock (not shown) that is included in the tablet computer (10). This time is referred to as world time. In a particular embodiment of the present invention, the GUI illustrated in FIG. 2a also includes a clock that pertains to the particular event (24). This time is referred to as event time. Actions can be synchronized to the world time as well as the event time. Other useful information can be added to the GUI shown in FIG. 2a, such as a priori data or data that represents the current state of the system (26). The placement and inclusion of the various regions are flexible and are only shown in this particular configuration for illustration purposes.

The data entry provided using the interface in FIG. 2a can be performed by more than one person each using their own tablet computer (10). It is contemplated by the invention to use the system described as part of an overall distributed system of multiple computer systems, such as multiple tablet computer's (10). In a particular implementation, one particular tablet computer (10) acts as the server for maintaining one or more clocks, and the other associated tablet computers act as the clients. Using wireless or wired connectivity, the current time is sent from the server tablet computer to each of the client tablet computers to form a network, in a particular system implementation of the present invention. Then, each of the users can enter a particular subset of data and the action logs (20) of the various tablet computer's (10) are merged from time to time in a manner that is known to those skilled in the art. This wireless implementation of the present invention allows log entries to be shared amongst all tablet computers in the network. For team sports where there is considerable activity and accuracy of the capture statistics is important, then multiple users can be utilized. This allows allocation of tasks associated with the overall data capture tasks between the various users.

FIG. 2a also includes access to the Video facility (88) which allows for the synchronization of the captured actions (52) with digital video frames. The purpose of this synchronization is to provide the ability to query the Statistical facility (30) in order to extract desired digital video clips. There are a number of methods to perform this synchronization. (i) By transferring the video from the digital camera to the computer in real-time during the event, actions can be simultaneously synchronized using the interface in FIG. 2a. At any point in the event, desired video clips can be extracted using the Statistical facility (30). (ii) If a digital video of an event is provided after the event is completed, then the user can load the video onto the computer, play back the video, and synchronize captured events according to the viewed video, using the same interface in FIG. 2a. (iii) If the actions are captured live at the event using FIG. 2a and the digital video is captured independently, then the events can be synchronized post-event by loading the video onto the computer, playing back the video, and simply tapping a button to synchronize a captured action that is observed at the appropriate moment in the video play back. (iv) Further to (iii), for video sequences captured using world time (that is, without pausing the digital video capture), then the video can automatically be synchronized with the actions that also use world time.

It should be understood that the present invention can be modified by a person skilled in the art to incorporate the functions described above to provide other real-time monitoring applications where the user would be required to maintain visual contact with the scene.

For descriptive purposes, this patent generally focuses the invention on team sports. Team sport personnel often keep track of necessary data using paper and pencil systems. Software systems do exist for these functions, but these generally perform dedicated tasks such as only tracking rosters, or only tracking games. There is a need for a system that integrates all necessary functionality into a self-contained unit and allows for ease of navigation through a series of consistent GUIs. Once data is captured in digital form, then advanced, novel statistical analyses can be performed using the captured data and planning can be performed without the need to access data from multiple sources. One aspect of the present invention, as illustrated below, is the computer program (14) that integrates these various functions by using a set of interfaces that throughout the storyboard retains certain common elements described below, and thereby improves on the ease of use of the present invention. This integrated functionality as presented by the invention is best understood by reference to FIG. 3a which is particularized below. It should be understood that one of the aspects of the present invention is that typically a number of different individuals have different reasons (depending on their roles or tasks) for being interested in capturing and analyzing data related to dynamic events in accordance with this invention. These roles/tasks can also vary with time, and depending on the particular circumstances of an event. One of the benefits of the particular embodiment of the invention that is described below, in which a range of facilities are integrated to analyze data captured in accordance with the invention, is that users who are familiar with using the application for one or more particular functions can readily use the application for different functions if there is a need to do so.

As stated earlier, the present invention provides a method and system for collecting, presenting and analyzing data based on an event, generally in real-time. The event could include live or events stored to a recording medium, such as a video-recorded event. Also as stated earlier, the present invention is particularly suited for capturing data related to the actions making up a dynamic even in real-time. The invention is therefore appropriate for gathering data in any dynamic environment, including, but not limited to, theatrical performances, traffic monitoring, political speeches, and polling systems. In particular, this is the case where the optimal capture of data related to the actions depends on the capture of attributes related to the actions such as time or location data. This particular aspect of the present invention is best understood by reference to the three examples described below: team sports, traffic analysis, and debate monitoring.

For team sports, region (18) as shown in FIG. 2a, represents a graphical playing field for the particular sport. As an example, for the game of hockey (FIG. 2b), the playing field would be the full regulation ice surface. Appropriate markings are provided to help landmark the playing field on the tablet computer's (10) screen. In region (18), the user will enter codings to represent particular actions on the playing field. For example, a player on a hockey team might attempt a shot at net. The player's number would be recorded at the same spatial location from where the shot was attempted and some code would indicate that a shot was taken, where it was targeted on the goal, and whether or not the shot was successful. Region (20) represents a row by row sequence of logged events captured or interpreted by the device. Logged events would include the interpreted codes entered in region (18). For example, entering '12S3' on the screen could be translated and reported in the event log as "8:02#12 Home Team—Attempted Shot at Target Location 3". Region (22) would be used to derive statistics based on all of the logged events. For example, in the game of hockey, statistics for the particular game would reflect how many shots on net were taken, percentage of shots per targeted location, how many of these were successful, how many penalty minutes a particular player received, and so on. Region (24) would be the game clock. In the case of hockey, the user would have control over starting, stopping, and resetting the clock. All events would be logged relative to the game clock as well as world time. Region (26) would represent components that represent the state of the system. For example, for the game of hockey, team rosters and an indication of who is currently on the ice would be stored in region (26).

Figure 2C:
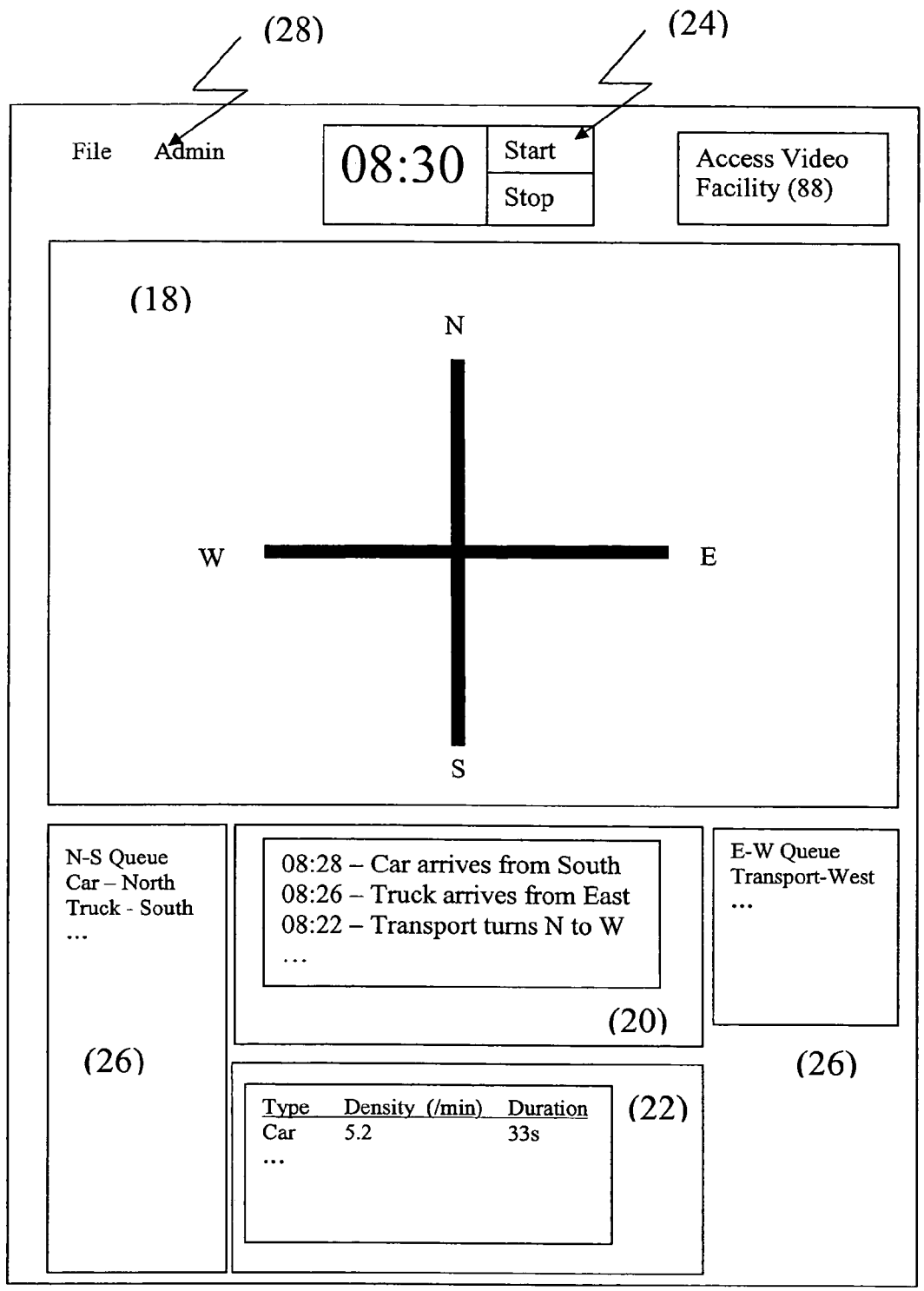
FIG. 2c represents the interface shown in FIG. 2a, but applied to traffic monitoring, in a particular embodiment of the present invention.

For traffic monitoring, the invention could be used to assess the traffic through an intersection (FIG. 2c). Parameters of interest include, but are not limited to, the type of vehicle, the prevailing weather conditions, and the path taken by each vehicle. Region (18) would represent a graphical depiction of the intersection, preferably a "birds-eye" view of the intersection. The user would be able to identify the direction north on the interface. The user would draw paths of vehicles as they go through the intersection. After the path was drawn, a code would be used to indicate the type of vehicle. For example, 'T' could represent a truck, 'C' could represent a car, etc. Region (20) would log the events. For example, a car passing through the intersection could be reported as "2:02 PM Car traveling south made right hand turn." Region (22) would report statistics such as on the traffic density for each road and the types of vehicles using the road. Region (24) would represent a standard 24-hour clock that would match the time of day. Region (26) would represent other conditions representing the state of the system, such prevailing weather conditions, which would be updated by the user as the weather changes.

Figure 2D:
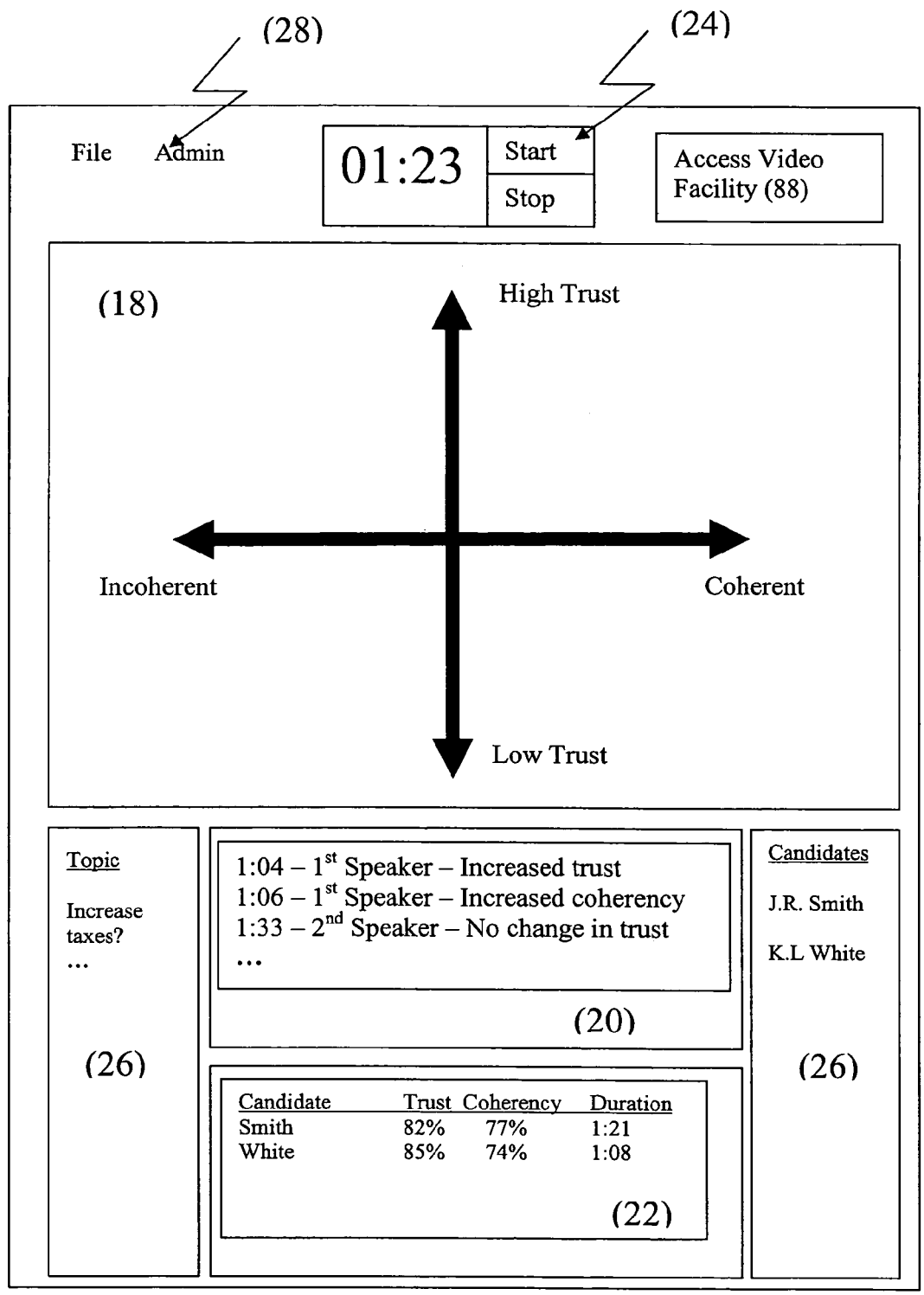
FIG. 2d represents the interface shown in FIG. 2a, but applied to the assessing a debate, in a particular embodiment of the present invention.

For debate monitoring, as an example, the invention could be used to monitor a political debate between opposing candidates (FIG. 2d). Examples of parameters of interest could include level of trust, ability to articulate, extent of eye contact with audience, perceived confidence, and so on. Region (18) represents the region where data entry occurs. The input could monitor the level of trust by treating the extent of the field of view (horizontal or vertical) as a scale. For example, moving the digital pen to the left of the field of view in region (18) would indicate a lowering of trust, while moving the pen to the right could indicate an increase of trust. Moving the pen in the vertical direction (or on some other particular angle) could simultaneously reflect some other parameter of interest. Also, in addition to this, a coding system such as that used in the team sports interface could by utilized. A number (representative of some scale) followed by a coding for a parameter of interest could also dynamically track observed events. For example, '1T' would represent a low level of trust, while '9T' would represent a high level of trust. Finally, the region (18) could also be equally split by vertical boundaries into 'n' equal segments so that each sub-region would accept data input for one of the 'n' candidates. Region (20) would report logged events as they are entered by the user. Region (22) would track ongoing statistics. For example, region (22) could report the overall percentage of time that the user had a high degree of trust for a particular speaker. Region (24) represents a clock that is used to temporally identify each event. Region (26) can be used to identify the state of the system. It could identify items such as which candidate is currently speaking or indicate the current topic of discussion.

Another example of an event well suited to the present invention is the judging of sporting events. For example, judging of figure skating requires that the judge monitor the athlete and enter scores for particular movements. The entering of the scores should be performed while the judge maintains visual contact with the event, supporting the need for the herein described invention.

For all of these examples, it is important for the user to maintain as much visual contact with the events as possible. The interface is designed to accept data input without staring at the input device to allow full visual event contact. As such, the user can capture all pertinent data without being distracted by the interface. Each interface is designed with land marking characteristics to enable minimal glancing in order to properly record the necessary data. Also, actions captured using each example can be synchronized with the Video facility (88).

A Graphical Play-by-Play (57) of the event as per the collected action data can be produced. The Graphical Play-by-Play is a means of dynamically illustrating the sequence of collected actions using a graphical facsimile for the actual event. As an example, for traffic monitoring, a bird's eye view of an intersection would be shown and the vehicles tracked as per the sequence of collected events would move in and out of the scene. Similar implementations would be performed for other events, including those associated with team sports. Either two- or three-dimensional graphical representations could be used, depending on the desired level of realism for the given application and domain.

Figure 7:
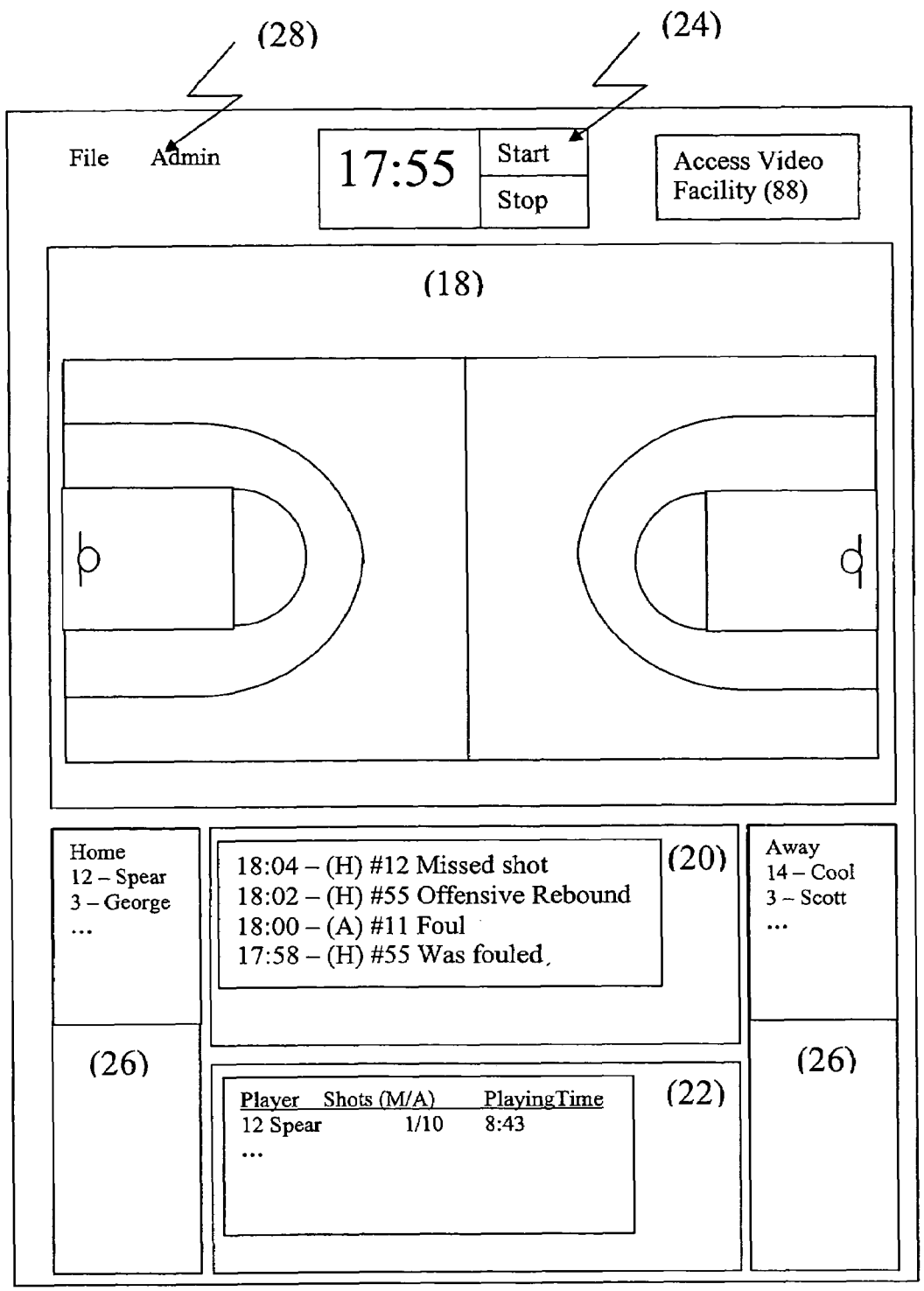
FIG. 7 in greater particularity represents the interface shown in FIG. 2a, but applied to the game of basketball, in a particular embodiment of the present invention.

FIG. 7 (described below) provides a complete description of this interface for the application of gathering statistics from an observed basketball game.

The balance of the descriptions relates to application of the present invention in the team sport environment, however, the team sport example serves to illustrate the advantages of the present invention as they relate to other environments where an event includes a series of actions with time and/or space attributes, which actions it is desirable to capture for analysis, and also to support such analysis in an integrated computer application with consistent user interfaces for ease of use.

Figure 3A:
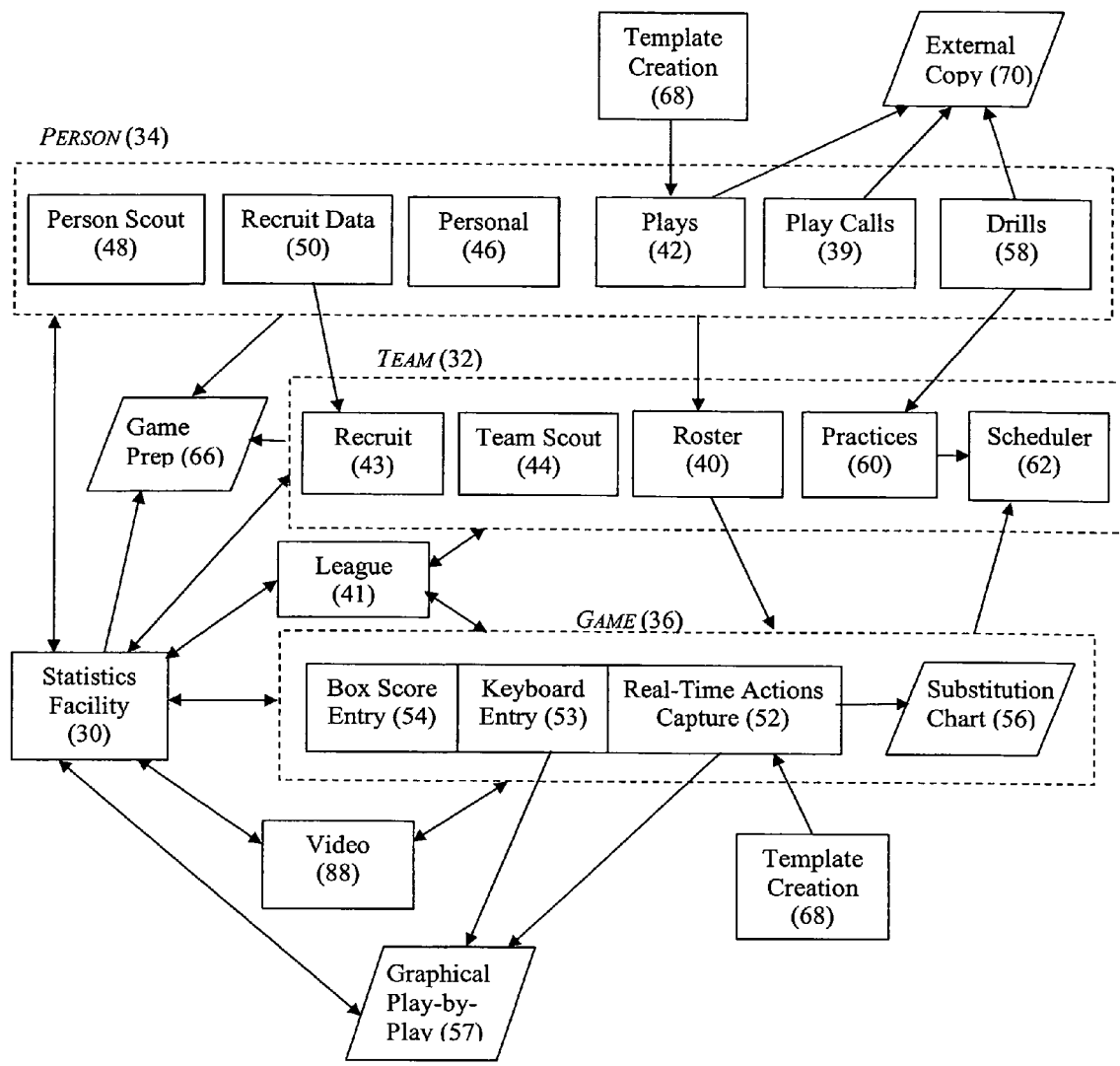
FIG. 3a represents the interactions of the various facilities of the invention for the application to team sports, in a particular embodiment of the present invention.

FIG. 3a represents the interactions of the different functions of the present invention. The present invention is not limited to any particular software design or architecture. The functions described herein, including those illustrated in FIG. 3a can either each represent a corresponding software module, or a single software module can provide more than one, or in fact possibly all of such functions.

As shown in FIG. 3a, the computer program (14) of the present invention defines three environments: TEAM (32), PERSON (34), and GAME (36). These environments should also be understood as organizations of facilities provided by the computer program (14) of the present invention. The TEAM (32) environment provides functionality associated with one entire team. This environment contains the Roster facility (40), the Team Scout facility (44), the Recruit facility (43), the Practices facility (60), and the Scheduler facility (62). The PERSON environment (34) is an organization of facilities associated with individuals including, but not limited to, players and staff. This environment contains facilities associated with each person: namely a Personal facility (46), Person Scout facility (48), Recruit Data facility (50), Plays facility (42), Play Calls facility (39), and Drills facility (58). The Template Creation facility (68) is used to create the arrangement of text boxes and play area diagrams (for example, a bird's eye view of a graphic for a basketball court or hockey rink) as deemed by the user. The External Copy facility (70) is used for transferring graphics in the Plays (42), Play Calls (39), or Drills (58) facilities to an external application. The GAME environment (36) is an organization of facilities associated with the capture (both real-time and post-game) and analysis of game data. The Real-time Actions Capture facility (52), Box Score Entry facility (54), and Keyboard Entry facility (53) are methods for the input of raw event-related data. The Substitution Chart facility (56) is produced from the raw event-related data. This facility is used to track player substations (and consequently, playing time) as a function of game time. Additional information such as attempted shots can be included in the Substitution Chart facility (56). The Statistics facility (30) provides a mechanism to access desired information from the three environments for analysis by the user. Data can also be passed from the Statistics facility (30) into the League facility (41), Video facility (88), and Game Prep facility (66).

A plurality of teams, persons, games, drills, practices, leagues, Game Preps, templates, and schedules can be generated within the invention.

Depending on the needs of the end user, the invention can be used in a number of ways. The following are such examples, but the device is not limited to them. Scorekeepers can use the device to capture real-time game statistics using the GAME environment (36). Scouts can capture actions using the GAME environment (36) as well and, without any loss of generality, can capture actions on any subset of players or events. Scouts can then synchronize the actions with digital video of the event. Scouts will also use the TEAM (32) and PERSON environments (34) to collect play data and to gather scouting notes on teams and players. Statisticians will use the collected data from the GAME environment (36) within the TEAM (32) and PERSON environment (34) to analyze and numerical and spatial tendencies of players and teams. By sharing data using a common database (16), as particularized below, the coaches can prepare for games using data collected by themselves and other personnel through the Game Preparation facility (66). Coaches would also make active use of the Drills facility (48) and the Practice facility (50). All personnel can make use of the Scheduling facility (52). A league manager can create league-wide statistics for web and media distribution using the League facility (FIG. 12). All teams in the league could enter and share data by accessing the same complete database using this invention.

Figure 3B:
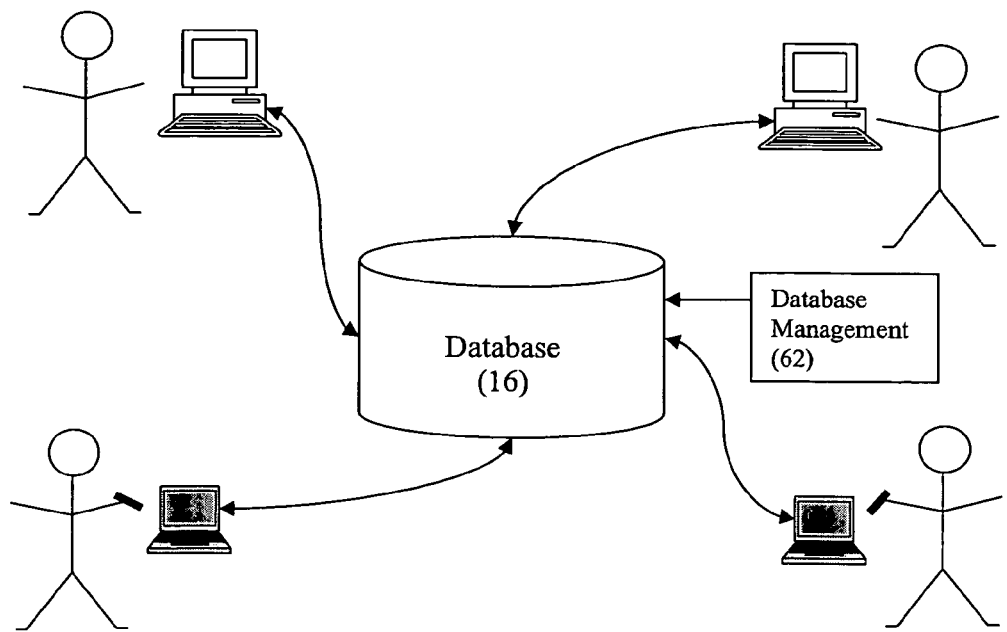
FIG. 3b represents the interaction of the users with the combined database.

FIG. 3b represents the interaction of the users with the combined database (16). All users are able to enter and share data, perform planning operations, and study statistics, although each user may be given restrictions depending on the permissions assigned for accessing the database, by operation of a known Database Management facility (63) which enables management of access to data based on hierarchical permissions in a manner that is known. Users can access data using standard computers or using tablet computers. The computers can connect to the database using a wired or wireless configuration.

The TEAM environment (32) is illustrated in further particularity in FIGS. 4a, 4b, 4c, and 4d. Each of these Figures illustrates a representative embodiment of a WINDOWS® based GUIs that in turn illustrates the functions of the related aspects of the computer program (14) of the present invention. It should be understood that these GUIs are examples only and can be modified without departing from the invention.

FIG. 4a illustrates the GUI representing the operation of the combined Roster (40) and Team Scout (44) facilities of the TEAM environment (32). The Roster facility (40) provides an interface to enter and access player (108) and staff (110) data. The Team Scout facility (44) provides an interface to enter and modify scouting data for the team and is located at the bottom half of the figure. Text boxes can be setup to capture a certain scouting component for the team. Data entry in the text boxes can be performed using either a computer keyboard or the digital pen (12). File links can be placed in the Team Scout facility (44) text boxes by operation of the File Link facility (71). Data to be sent to the GamePrep can be selected using the GamePrep facility (66). To access or enter player/staff data, either a new player/staff is created or an existing player/staff entry is opened. This generates an interface for the individual person using the PERSON environment (34).

Figure 4B:
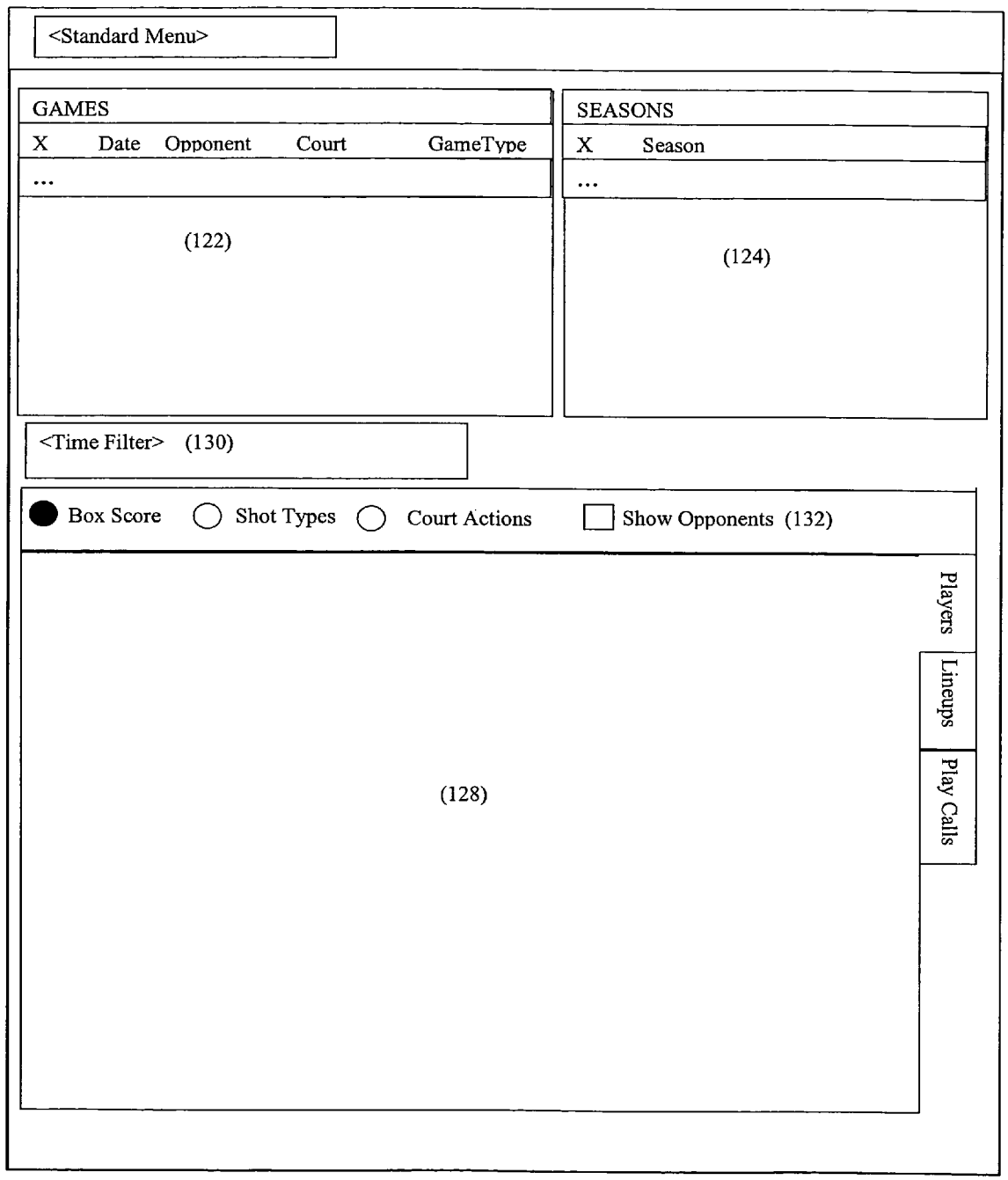
FIG. 4b is a representation of a particular embodiment of a GUI for the Statistics facility of the TEAM environment for accessing numerical and graphical data of the computer program of the present invention, in one particular embodiment thereof.

FIG. 4b represents a GUI illustrating the operation of the Statistics facility (30) in relation to the TEAM environment (32). At the top of the interface is a GameSelect function (122) that lists all games associated with that team for the indicated season (124) and enables a user to select one or more subsets of games from which to derive subsequent statistics. The Statistics facility (30) can provide multiple unique interfaces for observing team and player statistics. Here, nine such interfaces are described and each one is obtained by combining one of layouts ('Box Score'/'Shot Type'/'Court Actions')

with one of data sources ('Players'/'Line Ups'/'Play Calls'). 'Box Score' and 'Shot Type' each represent columns of the presented data (128) while Court Events represents individual playing fields. 'Players', 'Line Ups', and 'Play Calls' represent the row data for the data (128). For example, when the user selects 'Box Score' with 'Players', the table depicts a standard box score with rows representing players and columns showing standard data for that sport (for example, attempted shots, rebounds, etc. for the game of basketball). Also, for example, if the user selects 'Shot Type' with 'Line Ups', then a table with columns representing the type of shot and rows representing the line-ups will be presented. As a final example, if 'Court Actions' is selected with 'Play Calls', then actions that resulted from each play call would be presented on separate playing fields for that team sport (court, rink, field, etc.). In basketball, for example, the 'Court Actions' could display the location of attempted shots, rebounds, or any other collected actions.

It should be understood that the GUI presented in FIG. 4*b* can also be extended to the concept of providing defensive statistics for the team. For example, instead of each column representing an offensive category (e.g., points scored) by a particular player, line up, or play call, each column could also represent the points scored against the team when that particular player or line up was on the court or a particular defensive play call was invoked. Similarly, the GUI would display the offensive rebounds that occurred against a particular player, line up, or play call, and so on. Separate GUIs would be generated to display such information.

Controls are provided to promote compactness of the available data. Rows representing box score totals for each team can be expanded to expose box score data on a player-by-player basis. These rows representing totals for an individual player can then be expanded to expose box score data on a game-by-game basis for that player. Columns depicting averages per game can be expanded to show totals across multiple games.

Another example of a statistical representation is called 'Head-To-Head Line Ups' (not shown). In this representation, a table would rank contributions of each line-up relative to the opposing team line-ups. The comparative evaluation can be performed using any desired statistic. Columns (representing the current team) can be sorted to display in ranked order statistics such as points per game or steals per game and so on, on a line-up versus line-up basis.

Other controls can be included. Columns can be sorted by simply selecting the title for that column. A Time Filter (130) to select the event time period (for example, first half, last two minutes, etc.) can be provided. The user can choose to simultaneously display statistics for the opposition teams from the same subset of games (132).

The statistics presented by the operation of the Statistics facility (30) are preferably derived from the Box Score Entry (54), Keyboard Entry (53) or Real-time Actions Capture (52) facilities of the Game environment (36). Data entered via these three facilities are subsequently stored in the database (16) and accessed via the Statistics facility (30). The Box Score Entry facility (54) allows entry of numerical data accessible from existing box scores of games that have already been played. The Keyboard Entry facility (53) provides a means of entering keyboard codes to enter actions. The Real-time Actions Capture facility (52) allows capture of both spatial and temporal characteristics of actions and, as a result, this data can be used for more advanced statistics, as would be presented in the 'Shot Type', 'Line Ups', 'Play Calls', 'Court Actions' selections. The Real-time Actions Capture facility (52) stores events in a sequential action log that is parsed to generate the statistics in all areas of the Statistics facility (30).

Figure 4C:
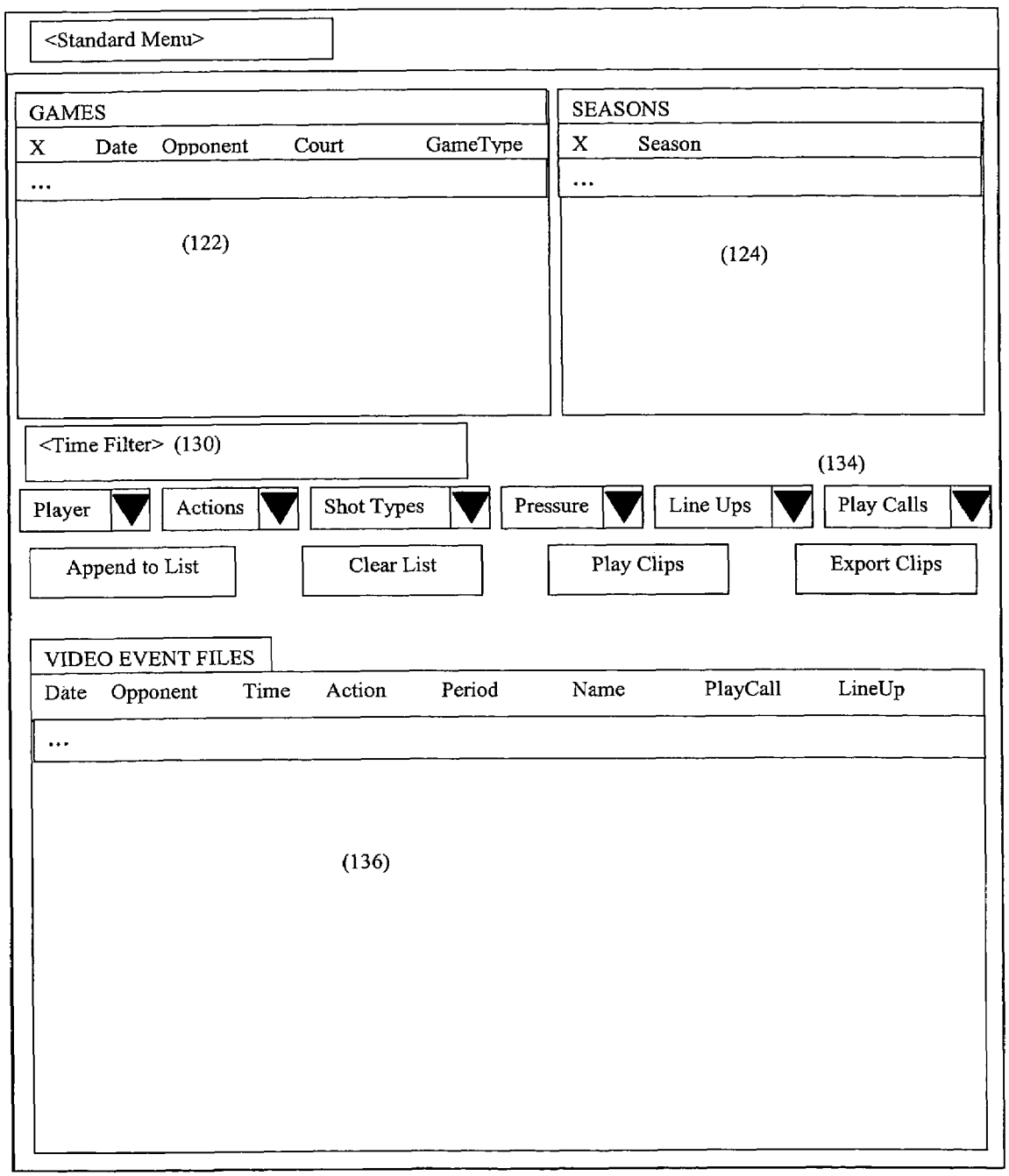
FIG. 4c is a representation of a particular embodiment of a GUI for the Statistics facility of the TEAM environment for accessing digital video clips of the computer program of the present invention, in one particular embodiment thereof.

FIG. 4*c* represents a GUI displaying the operation of the Statistics facility (30) in conjunction with synchronized event digital video captured using the Video facility (88) in relation to the TEAM environment (32). The top part of the interface is identical to that found in FIG. 4*b*. The bottom half has drop down menus for the user to select their choice of Players, Actions, Shot Types, Pressure, Line Ups, and Play Calls (134). A logical intersection of these categories is performed and, when the 'Append to List' button is selected, produces a listing (136) of clips that match the selected fields. Choosing different fields and again selecting the 'Append to List' button appends items to this list. Items in the list can then be selected and the video clip displayed. The clips are played directly from the proper location land marked in the full event video. Clips can be exported to a separate video file for future use, for example, as items linked using the File Linking facility (71)

FIG. 4*d* illustrates a representative GUI for, and the functions of, the Practice facility (60) of the present invention. The Practice facility (60) preferably presents five regions: general information with respect to the particular practice (76), a listing of drills (72), a practice itinerary (78), team players (108), and a statistical breakdown of drills (82). The general information (76) indicates the date and time of the practice as well as a listing of the objectives of the practice. The listing of drills (72) is identical to that in FIG. 5*d* (72), but resized to fit the available space. Specific drills are selected by the user from the listing (72) and by double clicking a particular drill are inserted at selected points in the practice itinerary (78). The schedule allows for modifying the start and end times of each drill, selection of staff who will direct the drill, and indication of which group of players will participate in the drills. The roster contains the names of all team players as derived from the Roster facility (40) in the TEAM environment (32). Each player can be selected as in attendance or not in attendance. Also, players can be assigned to a specific scrimmage team or grouping as indicated by a letter of the alphabet ('A', 'B', etc.). The statistical summary provides an indication of how much time is spent on each type of drill as well as each specific skill. These statistics can be generated based on a range of dates or by selecting a certain number of the most recent practices. In this sense, the staff can assess the total amount of time being assigned to each particular team or player skill as dictated by these cumulative statistics.

A Recruit facility (43) is used to list all current players under consideration for recruitment to a particular team. Both recruit and scouting information for each person being considered would be displayed across columns. Columns would be sortable. Players could be added and removed from the list, but removal from the recruit list would not delete them from the database. Player names would have linked capability directly to their associated Person environment (34).

A Schedule facility (52) is enabled using an existing third party application, such as OUTLOOK™. The Schedule facility (52) will contain a full calendar for any particular season. Practices, games, and other events can be scheduled and linked to the associated event data. Games can be linked directly to the associated GUI (e.g., FIG. 2*a*) for that game. Teams participating in the game or practice can be linked directly to their Team Roster facility (40). Practices are linked directly to the Practices facility (60) instance created for that practice. Schedules can also be used for creating individual player and team goals. Also, the third party application can be programmed to read in dates for games, practices and other events associated with the user.

The PERSON environment (34) is illustrated in further particularity in FIGS. 5a, 5b, 5c, and 5d. Each of these figures illustrates a representative embodiment of a WINDOWS® based GUIs that in turn illustrates the functions of the related aspects of the computer program (14) of the present invention. It should be understood that these GUIs are examples only and can be modified without departing from the invention.

Figure 5A:
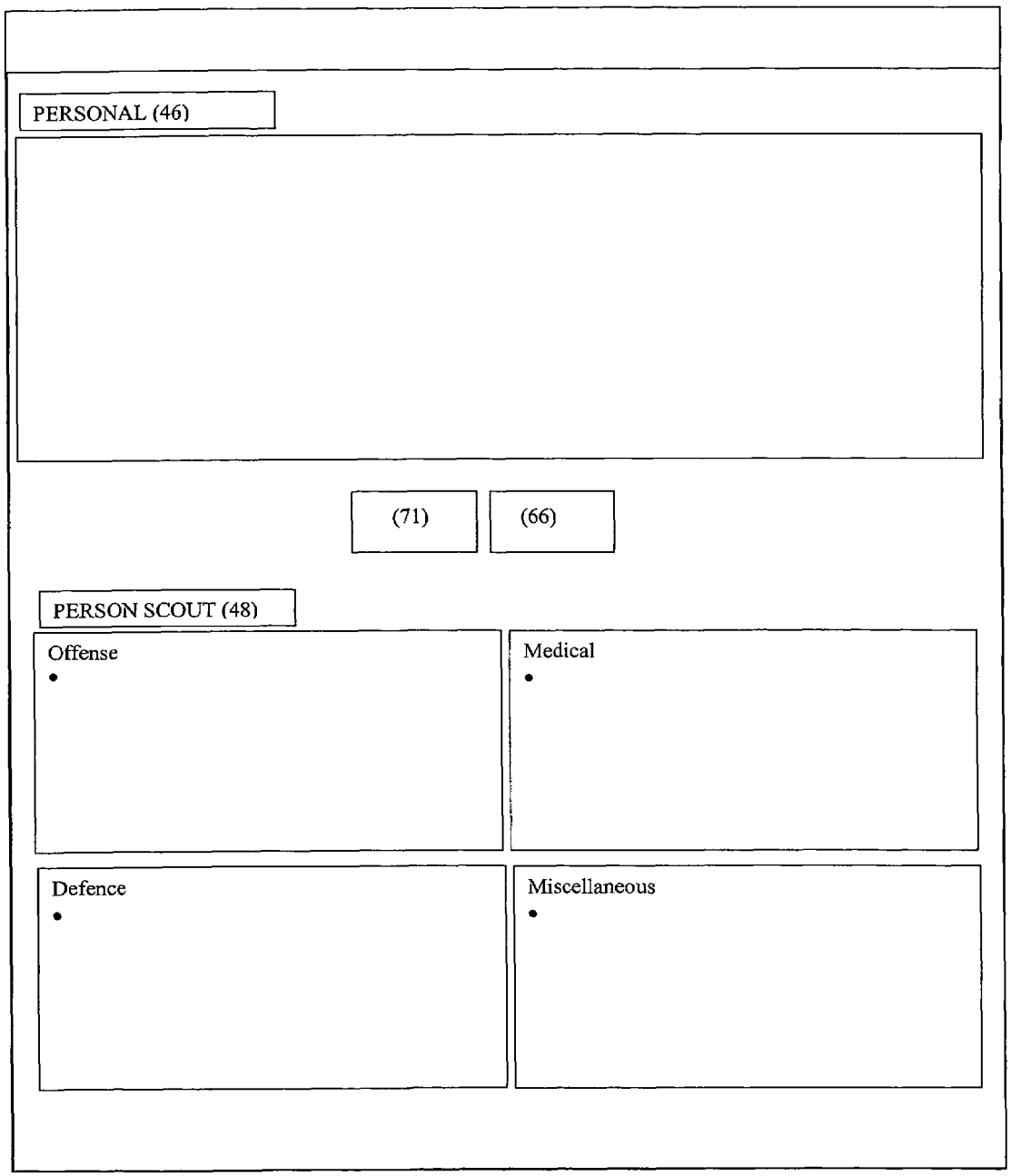
FIG. 5a is a representation of a particular embodiment of a GUI for the Personal and Person Scouting facilities of the PERSON environment of the computer program of the present invention, in one particular embodiment thereof.

FIG. 5a illustrates the GUI representing the operation of the combined Personal (46) and Person Scout (48) facilities of the TEAM environment (32). The Personal facility (46) is a known facility that enables personal (e.g. height, name, etc.) and contact information (e.g. local, permanent, next-of-kin) to be created, stored to the database (16) and managed in a manner that is known. The Person Scout facility (48) is a facility that is operable to create and store to the database (16) and provide access to specific scouting information for an individual. This information includes offensive, defensive, miscellaneous, and medical information. Its purpose is not only to track abilities of opponents, but also to track abilities of current personnel and personnel that are being recruited.

Figure 5B:
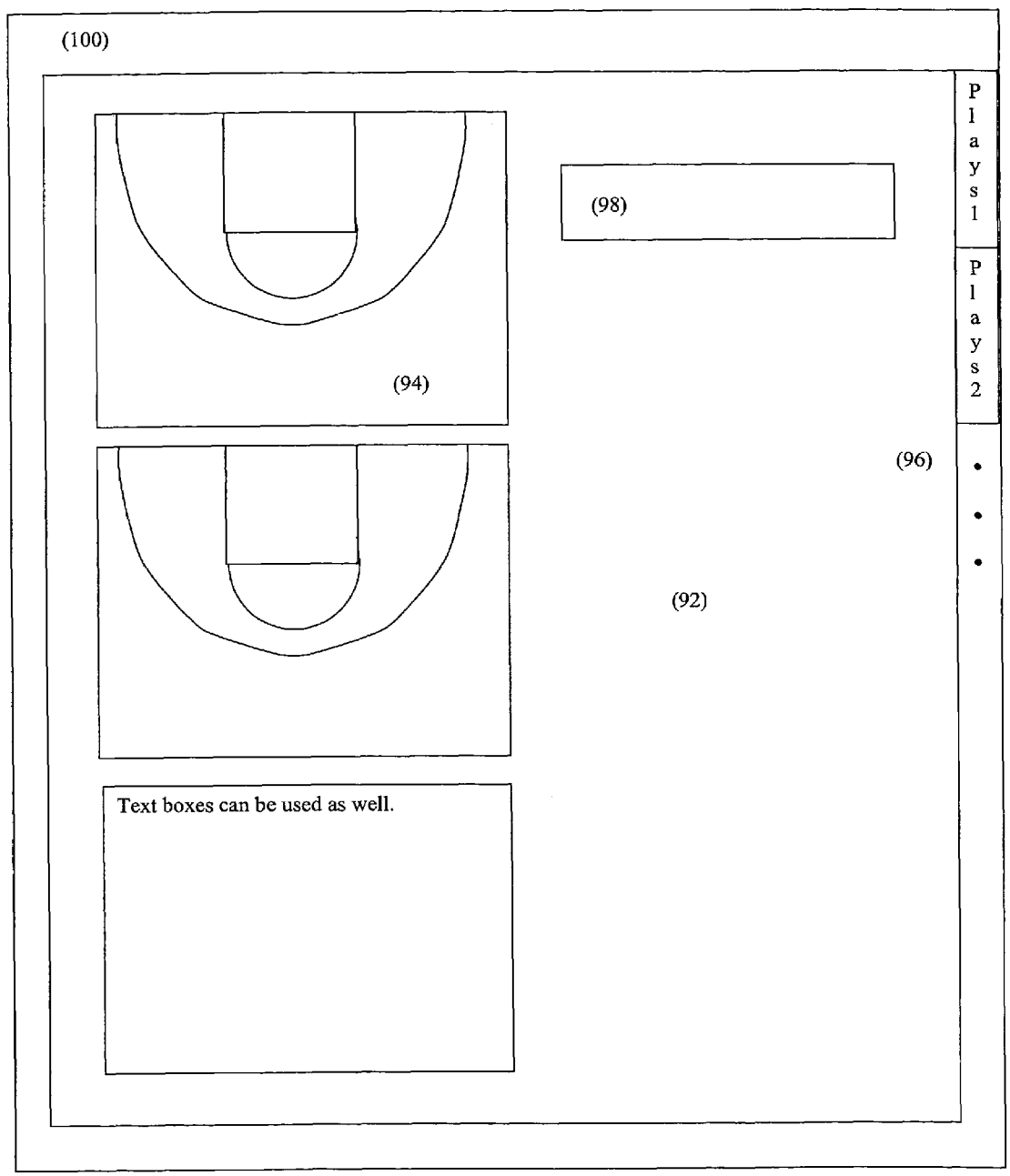
FIG. 5b is a representation of a particular embodiment of a GUI for the Plays facility of the PERSON environment of the computer program of the present invention, in one particular embodiment thereof.
Figure 5C:
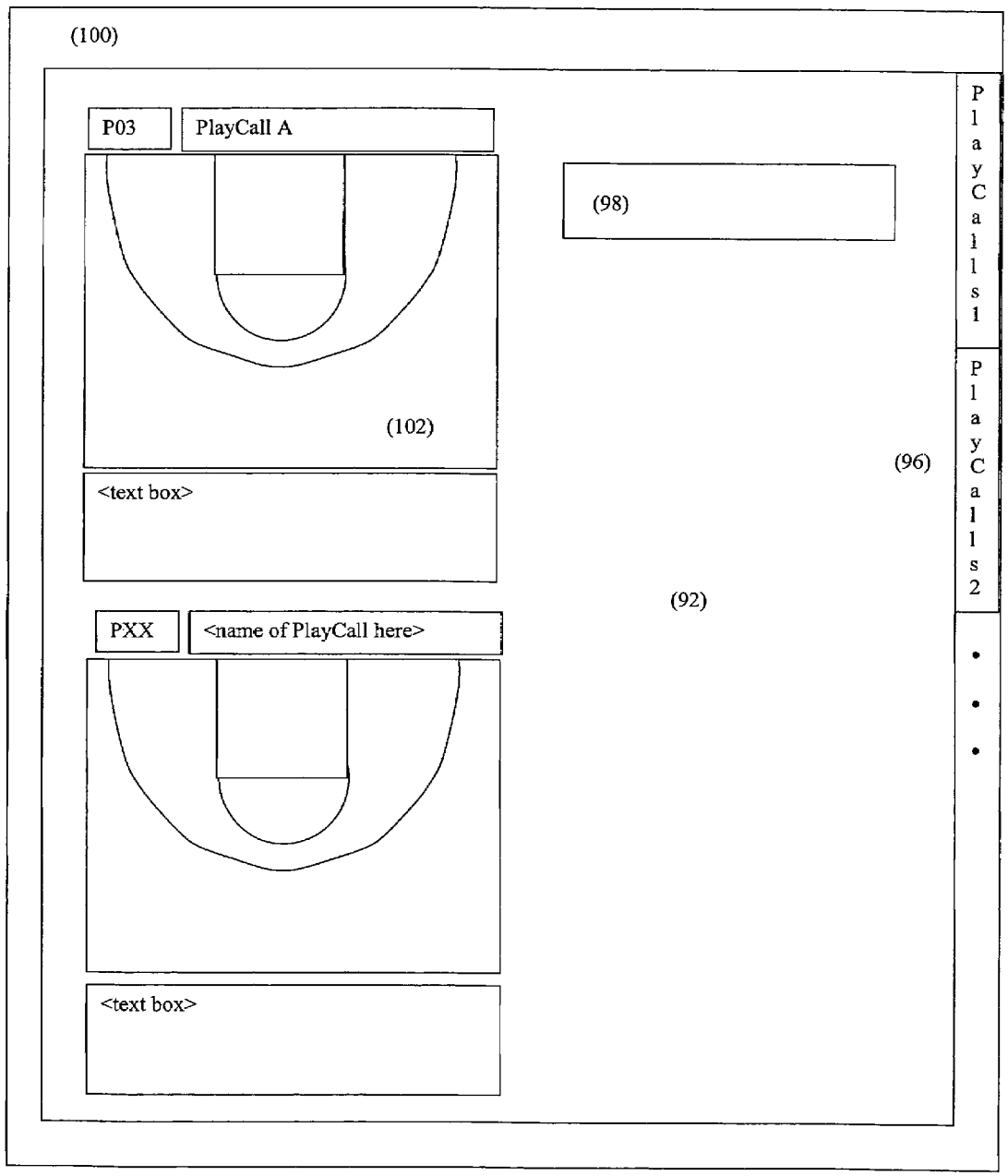
FIG. 5c is a representation of a particular embodiment of a GUI for the Play Calls facility of the PERSON environment of the computer program of the present invention, in one particular embodiment thereof.

FIG. 5b illustrates the GUI representing the operation of the Plays facility (42) of the PERSON environment (32). Plays can be entered on the given page presented by the GUI. The background of the page is generated using the Template Creation facility (68) and is stored to the database (16) designed for the particular sport. FIG. 5b illustrates an example layout of a playing field (a basketball court) for the game of basketball. A plurality of pages can be used for any given team and a plurality of templates is available for all teams. A group of play pages can be grouped into a separate playbook, with a user-defined title assigned to it. Each playbook might, for example, contain a group of plays pertaining to a certain category (offence, defence, etc.) or might pertain to a group of plays for a certain time period (playbooks could relate to certain seasons). Tabs (96) are provided for each play page in order to select a current page. Two drawing modes are available. The first drawing mode is freehand. This mode allows the user to enter ink data just like using a regular pen; however, the ink data is stored digitally on the tablet computer (10). Fundamental function calls to store digital ink using the digital pen (12) provided with the tablet computer (10) are provided through the SDK. The user can choose different colors and thicknesses for the ink. The second drawing mode makes use of the Digital Assistant Palette (DAP) facility designed and implemented for the particular sport (98). The DAP facility is used to convert freehand symbols and text to particular formatted symbols and text. For example, digits entered by freehand will automatically be converted to their ASCII equivalent at the same location on the template. Also, for example, for the game of basketball, hand drawn lines can be automatically converted to straight or curved lines and automatically formatted to dashes (to represent a pass) and wavy lines (to represent the motion of a dribbler). Depending on the user needs, they can choose to use freehand mode or DAP or both on any page. Standard methods for selecting, rotating, copying, and pasting from one page to another or on the same page are provided.

The Play Calls facility (39) uses the same type of interface as the Plays facility (42). That is, the Play Calls facility (39) presents a means to diagram play information and the Plays facility, for example, in cooperation with a drawing area and tabulated pages. In the Play Calls facility (39), diagrammed plays are assigned play call names and perhaps identifying numbers. A function is called to gather all provided play calls and put them together in a common list. It is this list that can be used to invoke play call actions during an event, as per FIGS. 2a and 7. The concept of Play Calls can be carried outside the team sport realm. For example, a comparable "Play Call" in traffic monitoring could be a particular path followed by a vehicle. So, a right hand turn or a U-turn at an intersection may be logged using a play call mechanism by assigning a numerical code to the action.

Figure 5D:
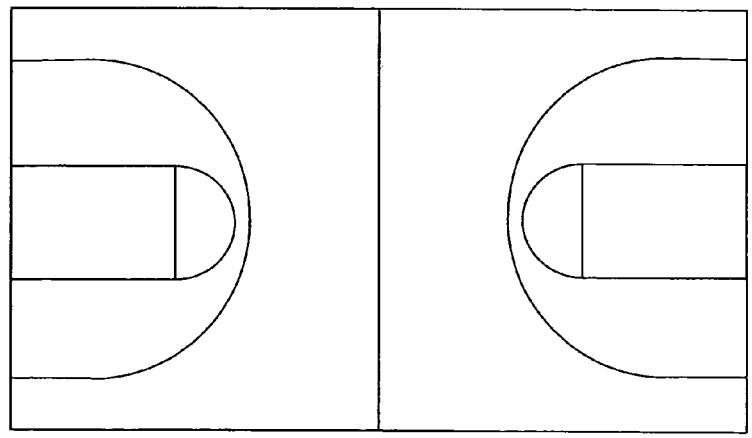
FIG. 5d is a representation of a particular embodiment of a GUI for the Drills facility of the PERSON environment of the computer program of the present invention, in a particular embodiment thereof.

FIG. 5d illustrates the GUI representing the operation of the Drills facility (58) of the PERSON environment (34). Drills are team and/or player exercises conducted primarily during practices designed to improve the abilities of the player/team. The Drills facility (58) provides a means to search the database (16) to access a particular drill from a complete list of drills (72) and display the details associated with a selected drill (74). Each drill has associated with it a name, type (offense, defense, etc.), specific skill (passing, shooting, etc.), duration for executing the drill (in minutes), number of players required to execute the drill, and date that the drill was entered into the database or last modified. The fields of the listing allow for searching and filtering of the drills. For a selected drill, the lower portion of the Drills facility (58) allows for presenting the information associated with that particular drill (74). This facility is identical in form and usage as the Plays facility (42), except in this case it is used to specifically characterize one single drill.

Plays (42), Play Calls (39), and Drills (58) facilities are associated with a person in the PERSON environment (34) since it is that person who devised and entered the plays, play calls, and drills.

A means to generate an external copy of ink data and selected background is provided using the External Copy facility (70) in any of the Plays (42), Play Calls (39), and Drills (58) facilities. A single playing field or any number of multiple playing fields or an entire page of playing fields as well as any associated ink data can be selected and an external digital copy created in a standard image format. This external digital, copy can then be pasted into any external software that can accept standard image formats. Commonly used image formats allow for wide acceptance of this functionality.

Figure 6:
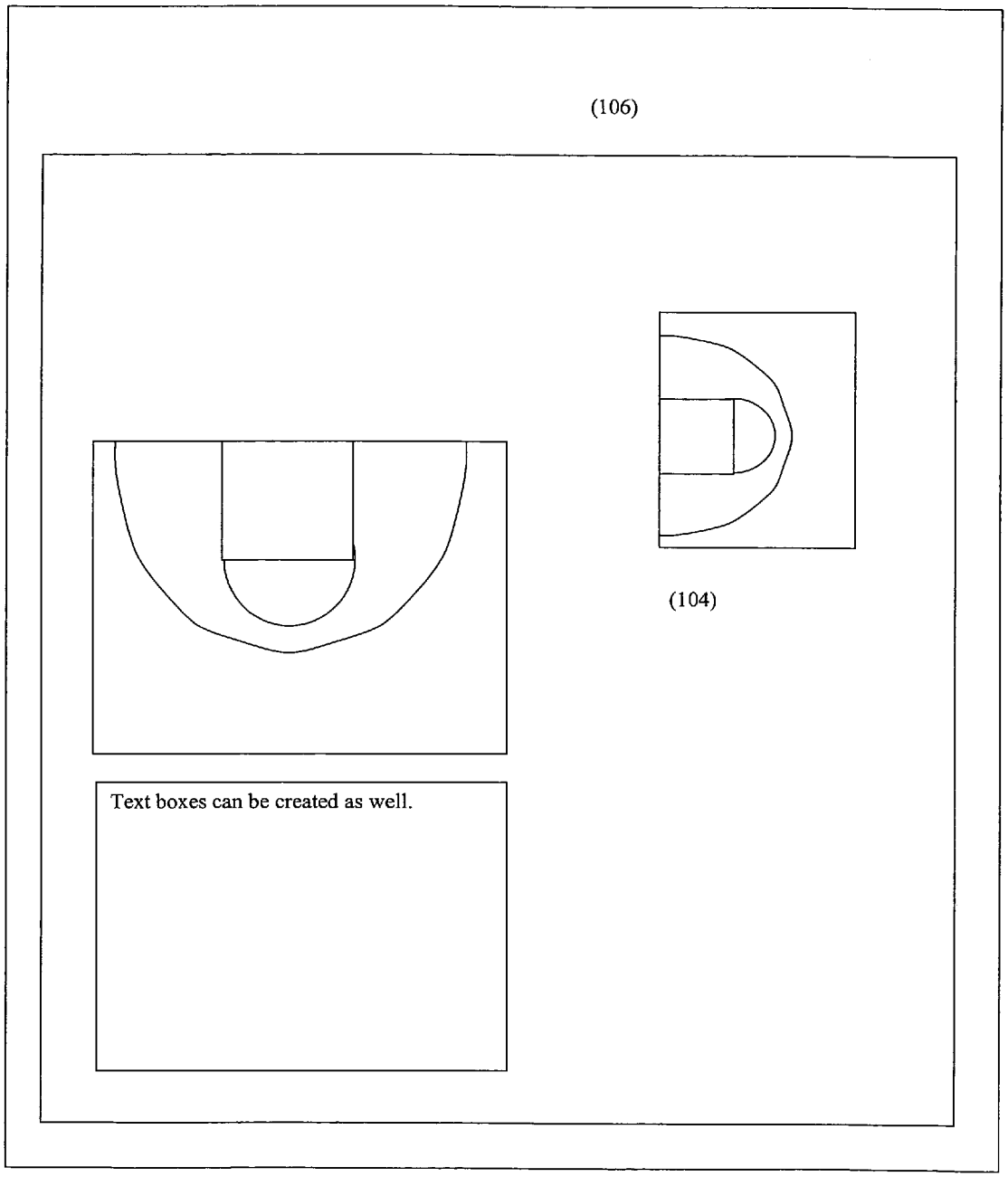
FIG. 6 is a representation of a particular embodiment of a GUI for the Template Creation facility of the computer program of the present invention, in one particular embodiment thereof.

The Template Creation facility (68) is illustrated in FIG. 6. This particular function of the computer program (14) allows the user to configure templates to suit their own needs by selecting (106) playing fields of various sizes and orientations or textboxes and placing them in desired locations on the template (104). Once created, the template is stored to the database (16), and then the computer program (12) is operable to permit the user to employ the template freely by operation of the Plays, Play Calls, and Drills facilities (58).

In relation to the PERSON environment (34), the Statistics facility (30) is operable to provide access to an individual's detailed game statistics for a plurality of games, seasons, and/or teams.

The Recruit Data facility (50) is operable to create and store to the database (16), and then provide access to, detailed recruiting information on the person. This includes information such as the individual's level of interest, preferences with regards to location, number of times contacted, and so on.

File links can be generated by the user to access other files residing on the computer or connected network by operation of a File Linking facility (71) possibly by accessing an icon from within a GUI associated with the Plays (40) or Scout (44). The user selects a file link button, which then allows the user to select the file to which the icon will link. The icon is automatically generated and can be placed and moved anywhere (at any time) on any page generated by the Plays facility (42), as best understood by reference to FIG. 5b. This allows for the user to link to existing videos, images, text files, or any other digital file to a particular play. Obviously more than one file link can be created to a particular play. File links can also be created in any of the available text boxes that can be found within the invention, such as those are found in the Team Scout (44) or Person Scout (48) facility.

A specialized technique is available throughout the TEAM environment (32). The Plays (42), Roster (40), Person Scouting (48), and Team Scouting (44) facilities are operable to allow a plurality of data to be stored and accessed. However, in order to easily transfer this knowledge to other interested parties, a convenient means of condensing the information is necessary. The GamePrep facility (66) allows for this, which is best understood as a means of selecting subsets of information from the TEAM environment. A digital highlighter (not shown, but enabled by programming the digital pen or mouse functionality) is available for the user to select certain plays, statistics, or scouting information for a particular team and/or person. Once selected, the data is channeled to a particular file in the tablet computer (10) for output or for electronic access thereto. This provides an easy means, for example, for a summary document to be created for players to review in preparation for an upcoming game. It would also provide an easy means for a head coach to present condensed information to assistant coaches or other personnel.

A form of this invention (presented in FIG. 2a) dedicated to the game of basketball is displayed in FIG. 7. The Real-time Actions Capture facility (52) is referred to as 'GameStats' when applied to the game of basketball in the current embodiment. This represents a particular embodiment of the present invention, based on the GUI described above in relation to FIG. 2a. Data entry is performed on a full basketball court modified for this application. Relative to a regulation basketball court, the basketball key area has been increased in scale and the extent of the 3-point line has also been increased in scale. This is done so that the user can enter data using the digital pen in large regions without significant concern with regards to land marking in the proper region. This enables the user to focus on the rapid events occurring during the basketball game while only glancing at the screen in order to landmark properly and subsequently enter the coded data.

Coded sequences are used to enter actions in (18), or a sub-set thereof as described above, as they occur during the game. The basic form of the coding used in this embodiment for the game of basketball is a digit, followed by another digit, followed by a letter. The two digits represent the player number. The letter or symbol represents the event. Digits and letters must be uniquely interpretable by the system. The codes are entered on the full court. The spatial location is marked by the start of the first stroke for the first digit. A made basket is indicated by the letter 'm'. A missed basket is indicated by using a dash ('-') following the player number. All shots are assumed to be taken in the team's front court. This enables the unique assignment of the player number to a particular team. A made shot within the 3-point line is assigned 2 points; outside the 3-point line, the made shot is assigned 3 points. Other letter codes include the following representations. For the home team (using the first letter of each event), 'R' is used for rebound, 'S'/'s' is used for steal, 'V'/'v' is used for violation/turnover, 'F'/'f' is used for foul, and 'W'/'w' is used for 'was fouled'. For the away team (usually using the last letter of the event, unless the letter was already taken), 'd' is used for rebound, 'l' is used for steal, 'n' is used for violation, 'U'/'u' is used for foul, 'e' is used for 'was fouled', and 'r' is used for turnover/violation. (The uppercase and lowercase versions of letters such as 'S'/'s' and 'U'/'u' can not be independently distinguished using handwriting recognition so these letters are treated as the same code.) Rebounds coded in the team's front court are assumed to be offensive rebounds and rebounds coded in the team's backcourt as assumed to be defensive rebounds. For either team, 'B' is used to represent a blocked shot (always occurring in each team's backcourt), 'a' is used for assist (always associated with the last made shot), 'Y'/'y' is used to indicate a made free throw (always occurring in the team's frontcourt), and 'N' is used to indicate a missed free throw (always occurring in the team's frontcourt). Substitutions are recorded in a team's front court using 'b' for a player substituting into the game and a 'O'/'o' for someone substituting out of the game.

A shortcut form of the coding exists. If the same player performs multiple actions in sequence, then there is no need for reentering their jersey number. For example, if #10 of the home team steals the ball, misses a shot, rebounds and then makes a shot, the coding would appear as '10S-RM'. Note that the codes can be entered anywhere in the region (18), even on top of each other, and be properly read by the system.

Actions assigned as team actions can also be recorded. Sometimes, a rebound is assigned to a team instead of a single player. This is recorded using '^' instead of the two digit number. So, a team rebound for the home team would be recorded as '^R' and a team rebound for the away team would be recorded as '^d'. Dead ball rebounds are recorded as '^D' and are entered in the front court for each team. Team turnovers as recorded as '^V' and '^n' for the home and away teams respectively. Sometimes, many substitutions enter the game at the same time. Under this circumstance, it is often simpler to reset the roster to indicate that no player is currently on the court, and then use the following format to enter the numbers of players who are on the court: '^## ## ## ## ##', where '##' again represents a two digit jersey number of a player. This entry is made in the associated team's front court.

Passing and dribbling actions can also be recorded within the same coding system. Drawing a circle clockwise around a jersey number would indicate that the Home player associated with that number has the ball. If the next coding is the same player jersey number with a clockwise circle drawn around it, then it is recognized that the player dribbled from one location to another and still had possession of the ball. If a different player's jersey number is entered with a clockwise circle around it, then the first player successfully passed the ball to the second player. Using a counter-clockwise circle indicates possession for the Away team. As part of the Statistics facility (30), numerical statistics such as average number of passes prior to an attempted shot and average number of passes per player per game can be tracked. Also, graphical depictions of preferred passing regions can be produced, especially by analysis over multiple games. This passing information is important for continuity while presenting a Graphical Play-by-Play (57) since passing and dribbling represent a large component of the time used during a real basketball game. Without passing and dribbling in the Graphical Play-by-Play (57), there would be considerable time spent without any action occurring.

That the capture of passing and dribbling actions using the Minimal Glance System can be extended to other team sports should be mentioned. Hockey, football, soccer, lacrosse and other team sports require players to pass an object between them in order to succeed at the game. An easy means to track these passes is provided using the techniques disclosed as part of this invention. For example, in the game of hockey, tracking both rapid passes from one player to another and stick handling by a single person moving the puck to a more favorable location are important (comparable to passing and dribbling in basketball) and a Minimal Glance System can accurately and efficiently capture this information.

Any subset of these actions can be seamlessly collected. There are no causal relationships between the actions. If a user only wishes to enter actions based on one of the teams, or just collect attempted shots, then the interface works in exactly the same manner.

A means of practicing the Real-Time Actions Capture facility (52) is provided as a separate facility, called the Real-Time Actions Capture Practice facility (55). This facility has the identical coding system as used by (52) without any rosters, action log, or other pieces not required for the practicing of the interface. Rules for properly using the coding system are provided.

The actions captured via the coded entry region (18) are stored in the database (16) and presented as logged actions in region (20). As an example, if the user enters '12F' in region (18) at 8:07 of the game, then the log reports "8:07 (H) 12 Foul". All actions are tracked using the action log. All actions can be modified, deleted, or inserted using standard approaches in the action log region (20).

Since the user is visually interpreting the field of interest and is not able to verify the log in real-time to ensure proper data entry, audio feedback is used to provide an indication that the data was properly entered, in a particular embodiment of the present invention. The audio feedback would simply replicate the logged entry. This is especially helpful in the practice module. The audio feedback can be turned off or back on by the user.

Region (22) provides a means of reporting statistics based on the logged data for the current basketball game. Numerical statistics are reported in region (22) in the form of standard basketball boxscores using rows to represent teams/players and using columns to represent selected statistics, such as field goals attempted/made, three point field goals attempted/made, playing time, and so on. Current statistics are provided by selecting the update button. Also, a means of presenting court action statistics are also provided. As an example, by selecting the home team and requesting their shooting court events, all made and missed shot attempts with the associated player number are mapped to the court in region (18). These 'shot charts' are an important product for analyzing a team's performance and these are easily accessed through the provided interface in conjunction with the Statistical facility (30). Either numbers or color-coded dots (or both) can be used to represent the court location and shot type for each particular action. Any particular action can be presented in this manner. Either full teams or individual player court actions can be presented. A statistical summary is available at any point in the game.

Region (24) represents the game clock. This clock, for the game of basketball, counts backwards and can be easily stopped, started or reset to any particular time by the user. Some actions automatically start the clock while some other actions are used to automatically stop the clock, depending on the nature of the action.

Region (26) stores the team roster used for the particular game. It also displays, using a checkbox beside a player's name, which players are currently playing on the court. Each team roster provides an alternative means for tracking substitutions. By simply checking the box beside the player's name, the players on court status is toggled. A means of recording timeouts for each team is provided in region (26) as well.

As mentioned above, a preferred embodiment of the portable digital system of the present invention includes a tablet computer linked to a digital pen, and the computer application of the present invention loaded on the tablet computer. This configuration is ideally suited for the gathering of data. However, it should be understood that a tablet computer is not necessary for the present invention with respect to the subsequent interaction with the data. In particular, the various functionality of the present invention is operable using a standard personal computer and a mouse. In other words, the digital pen and tablet combination is effective for providing input to the system, but not necessary for viewing the output.

Play Calls can be invoked as actions based on the Play Calls facility (39) associated with the Head Coach for the team. Play calls can be invoked using one of two means. First, a play call can be invoked by entering (in the team's front court) the letter 'P'/'p' followed by the two-digit number assigned to the Play Call. Second, a play call can be invoked by selecting a button, the Play Calls listing for a team appears and using the desired Play Call is invoked by pointing and clicking with a digital pen or a mouse.

A graphical possession arrow can be used to track possessions based on the game possession arrow.

FIG. 8 illustrates a representative GUI for, and thereby the facilities of, a league facility (72) of the present invention. A league comprises of a group of teams. The league facility (72) allows access the teams grouped into subgroups to represent various conferences within the league. These teams are grouped according to their records in the league in the standings (84). The team standings are automatically generated based on statistics captured in the GAME environment (36) and accessed via the Statistics facility (30). Statistics based on ranked individual player performance can also be automatically generated (86). The ranked player performances can be filtered via action (shooting accuracy, offensive rebounds, etc.), individual conference, or position (guard, forward, etc.). Access to each team's TEAM environment (32) is provided by double clicking on the team in the standings. Access to the league's season schedule is accessed via the "Schedule" button. This allows access to a league schedule.

Methods

Figure 3C:
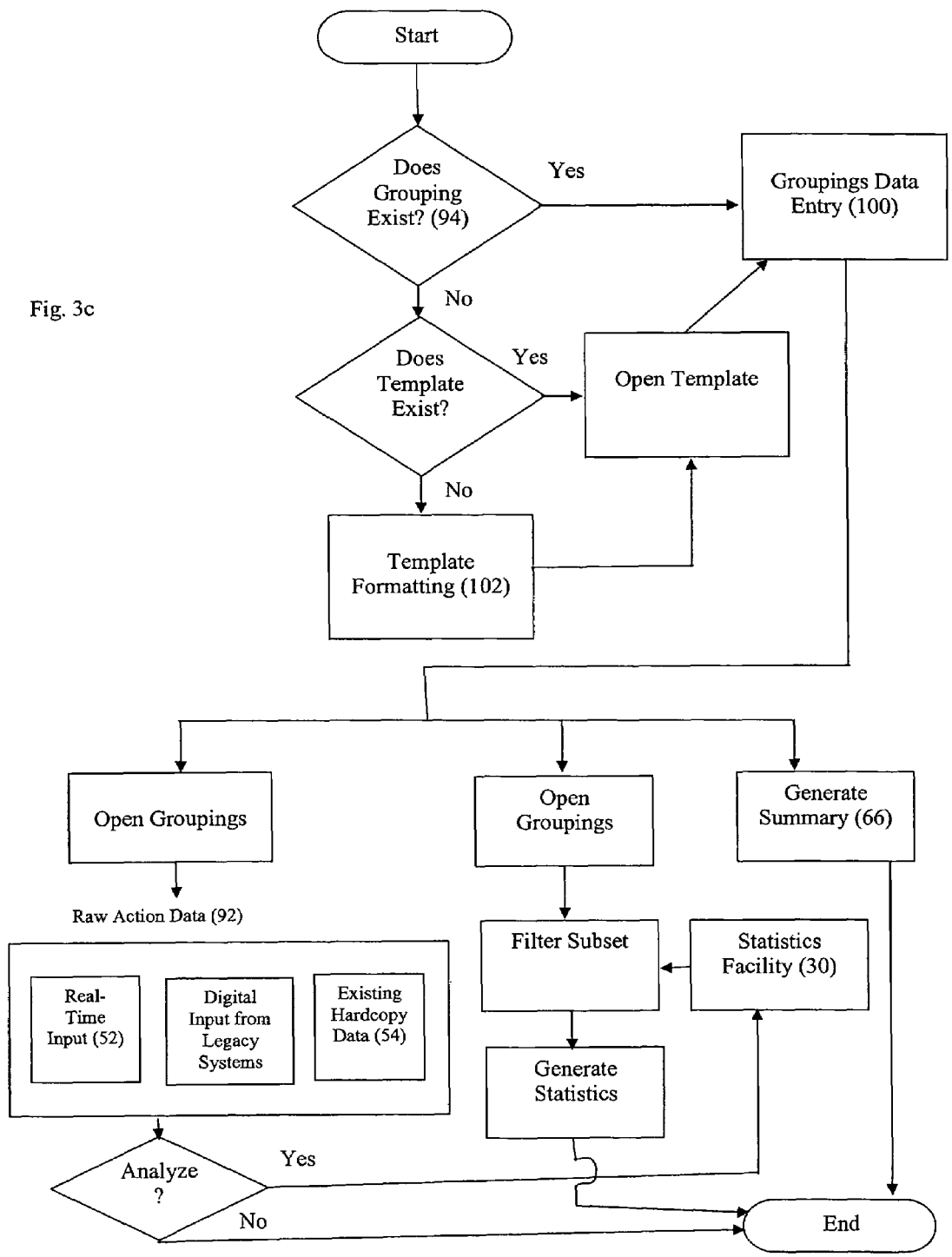
FIG. 3c is a workflow diagram illustrating the workflow of the present invention in operation.

As stated above, the present invention provides a method for collecting, presenting, and analyzing data based on an event, generally in real-time (FIG. 3c). This method includes the ability to capture raw action data (92) based on actions observed during events. Three methods are identified: real-time input (FIG. 2a), digital input from legacy systems (88), and manual entry based on existing hardcopy data (90). Real-time input (FIG. 2a) using a digital pen in the Minimal Glance System gives the opportunity for the richest set of data (by including spatial and/or temporal dependent characteristics) in dynamic environments using the herein described invention. Real-time entry using a coded entered via keyboard limits the amount of information that can be collected. Digital input from legacy systems (88) provides the opportunity for backward integration and can lead to more acceptability when using the invention. In a similar fashion, manual entry of hardcopy data (90) provides for backward integration so that historical data can be included. However, neither the legacy systems nor the hardcopy data generally contain the complete spatial and/or temporal profile necessary to access richer information. The raw action information (92) can be forwarded to a statistical facility for conversion of raw data to meaningful information. Groupings (94) identify objects in the scene from which actions are derived. In the case of basketball, these groupings are, for example, players, teams, and plays. In the traffic analysis example, the groupings can be vehicles and in the debating example, the groupings can be the debaters. Groupings must be entered into the system using a Groupings Data Entry facility (100) and flexibility in defining the groupings can be obtained through the use of templates generated by the Template Formatting facility (102).

The Groupings (94) are sent to the Raw Action Data facility (92) to coincide with the incoming raw data. Based on statistical information as well as user-entered groupings characterizations, a summary (96) can be generated for strategic planning purposes. Also, by selecting appropriate groupings, various statistics of interest can be viewed (98). By using the data captured in the real-time input facility (FIG. 2a), advanced statistics dependent on the spatial and/or temporal parameters can be determined.

Figure 9A:
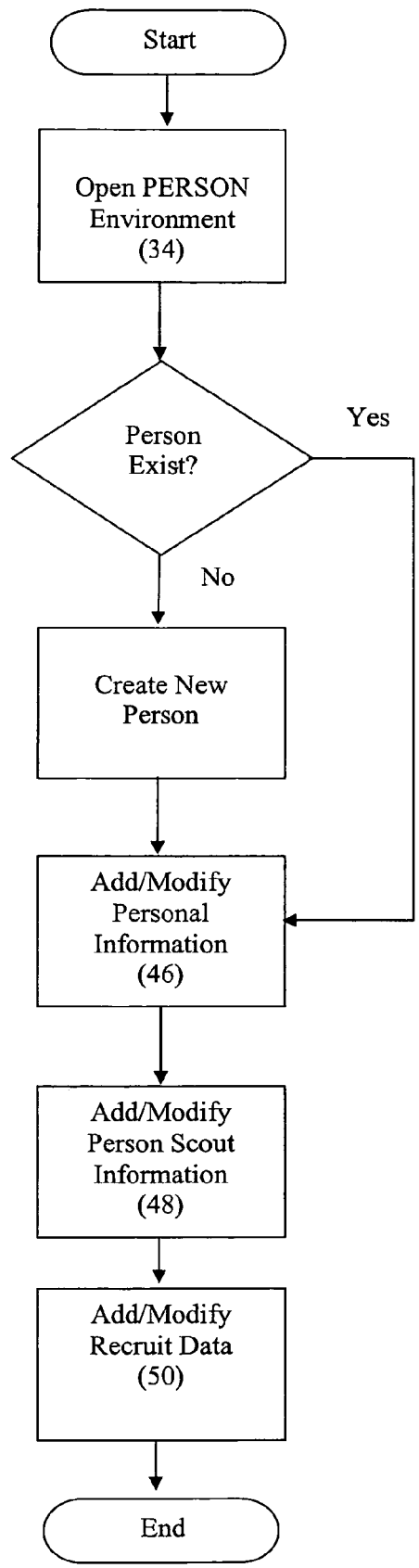
FIG. 9a is a workflow diagram illustrating a user either creating a new person or modifying an existing person already found in the database.
Figure 9B:
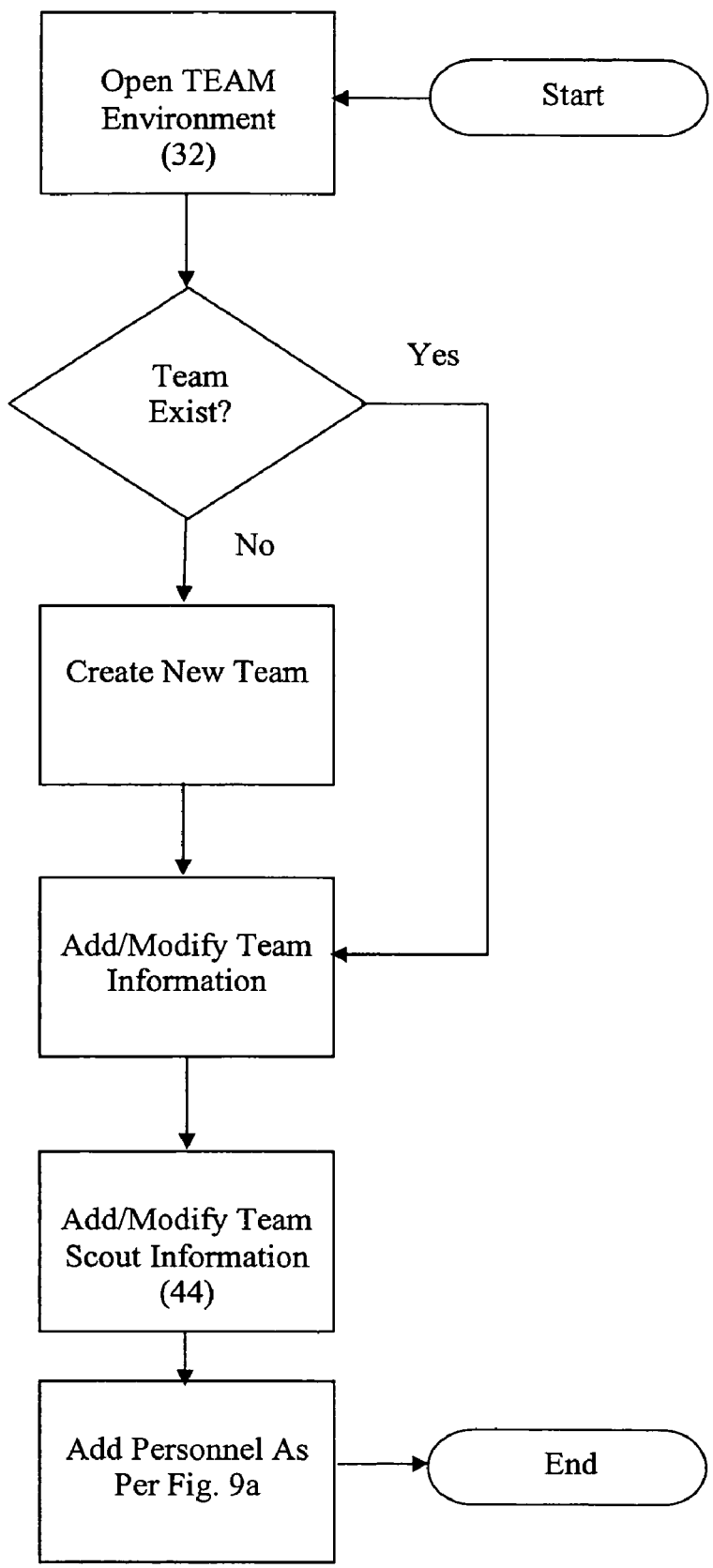
FIG. 9b is a further workflow diagram illustrating a user creating a new team or modifying an existing team already found in the database.
Figure 9C:
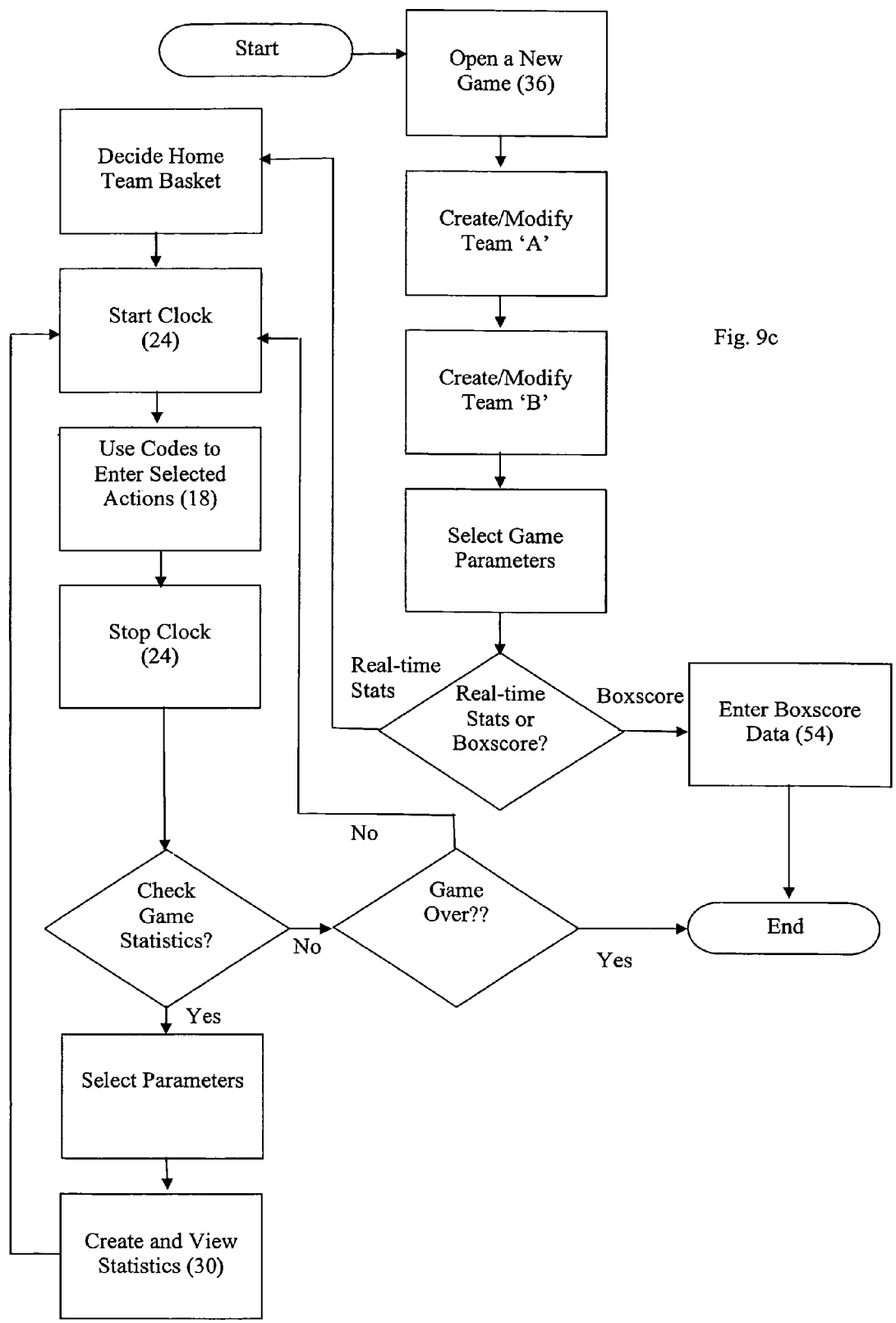
FIG. 9c is a further workflow diagram illustrating a user entering game actions for a particular game.
Figure 9D:
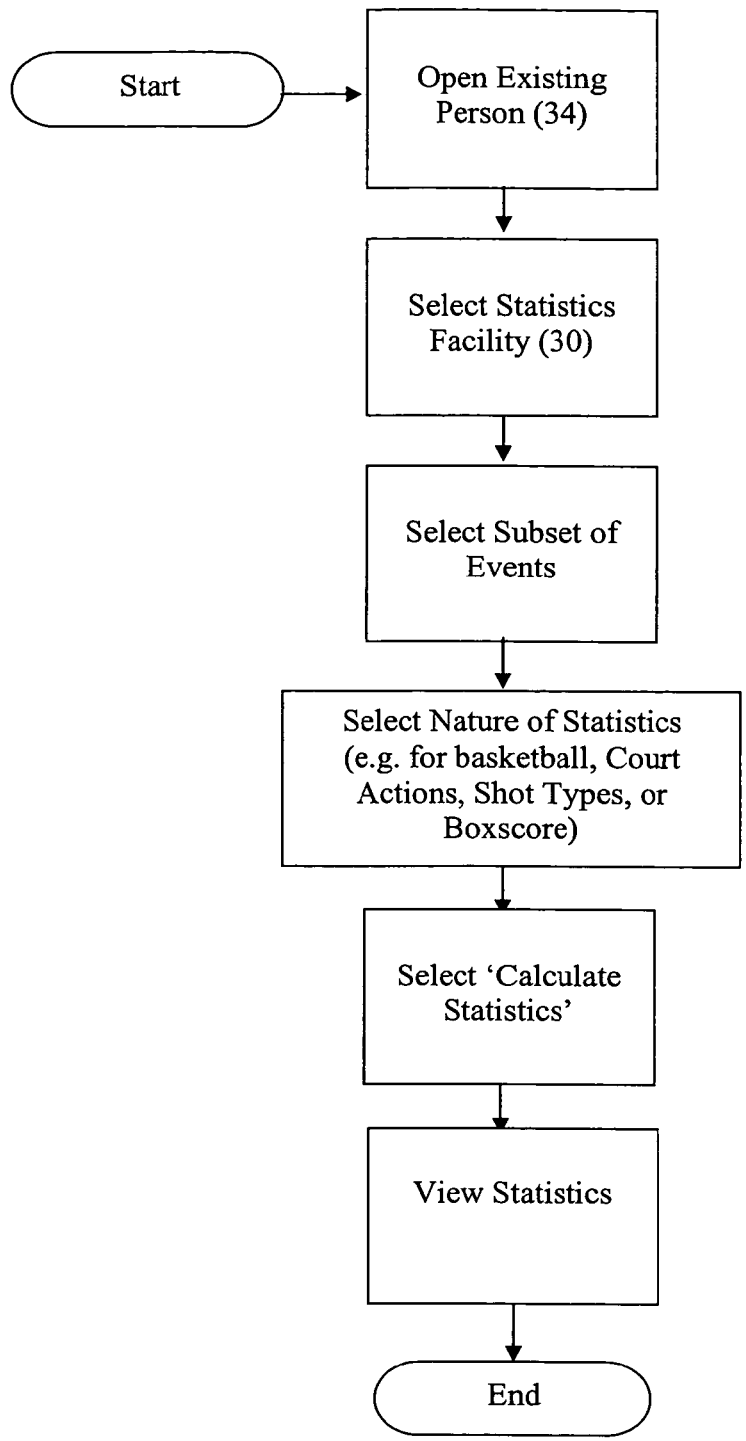
FIG. 9d is a further workflow diagram illustrating a user viewing a person statistics.
Figure 9E:
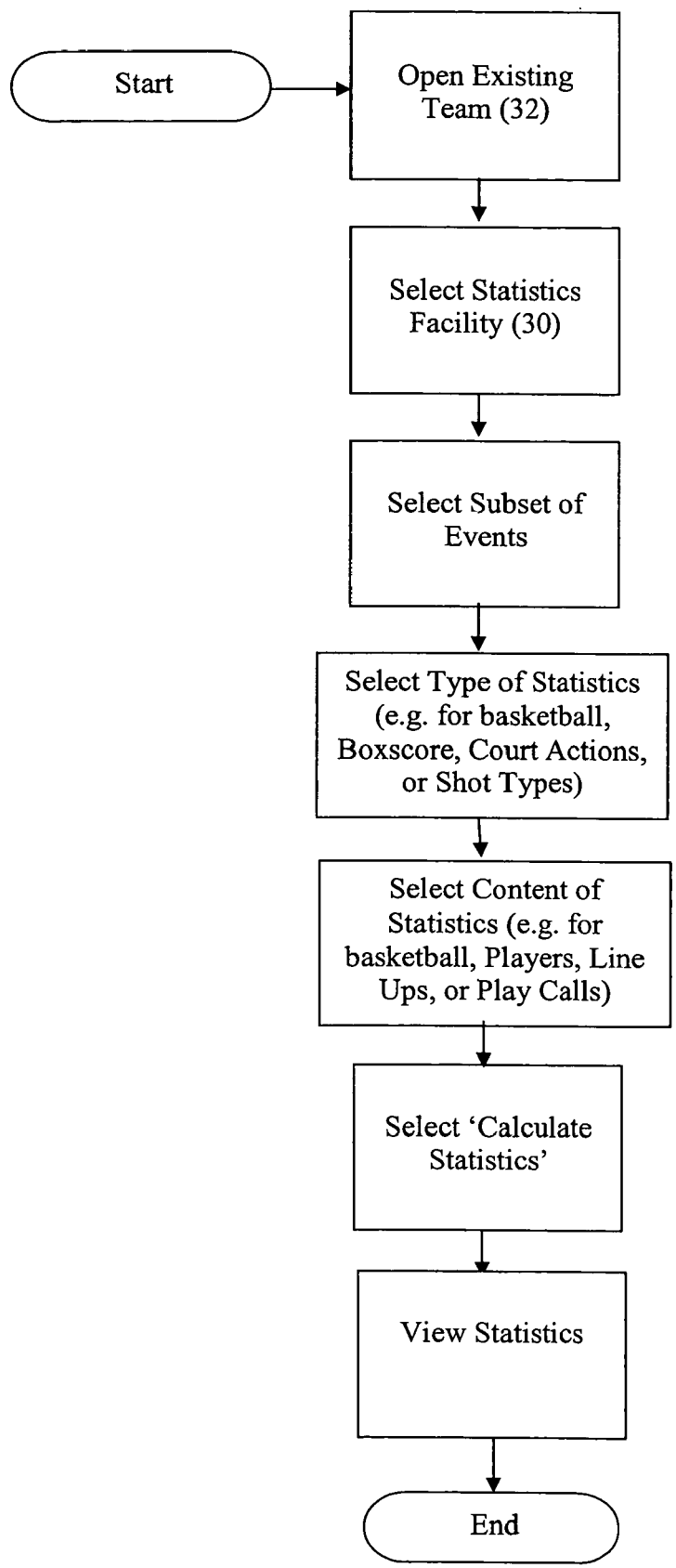
FIG. 9e is a further workflow diagram illustrating a user viewing team statistics.
Figure 9F:
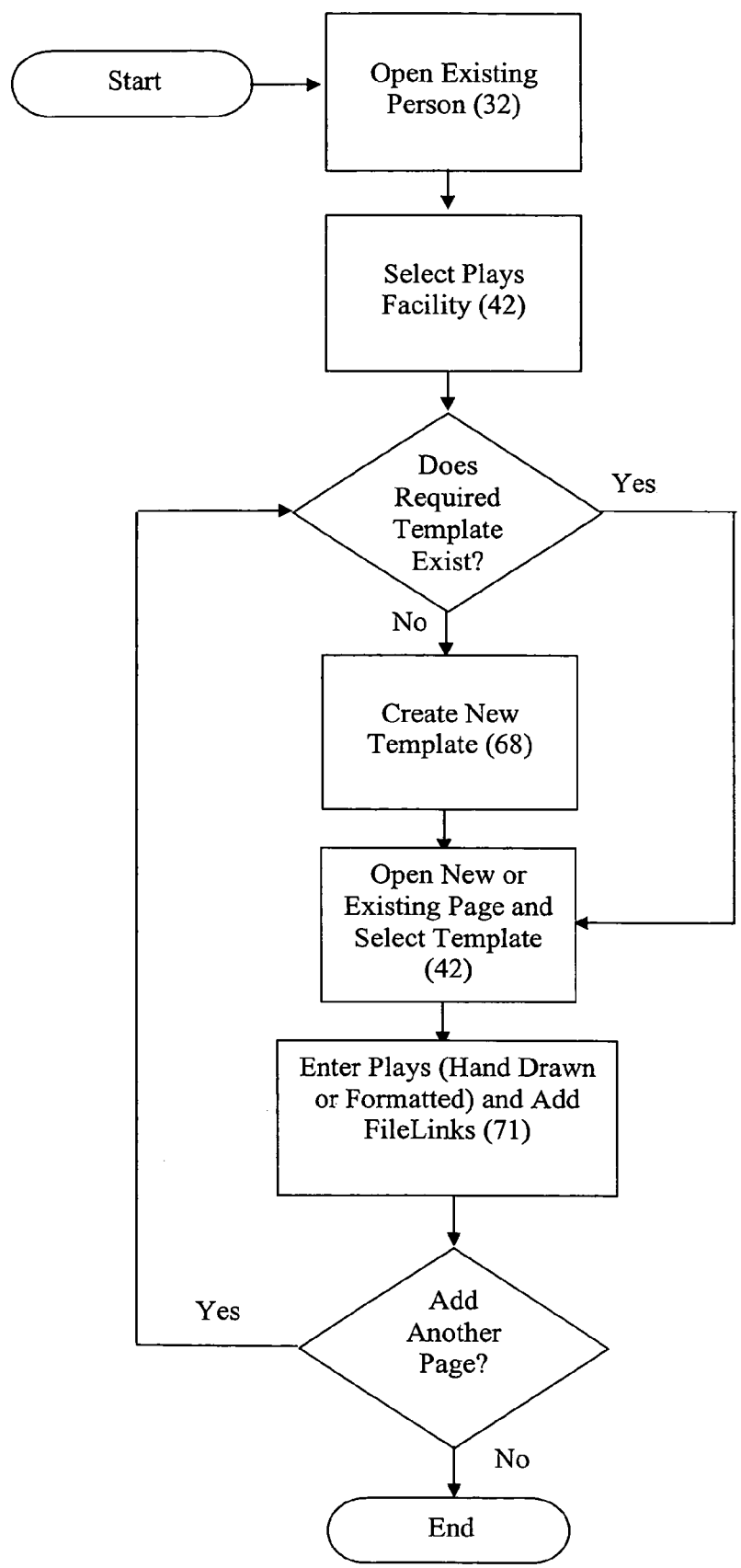
FIG. 9f is a further workflow diagram illustrating a user entering diagrammed plays and accompanying notes on the plays.
Figure 9G:
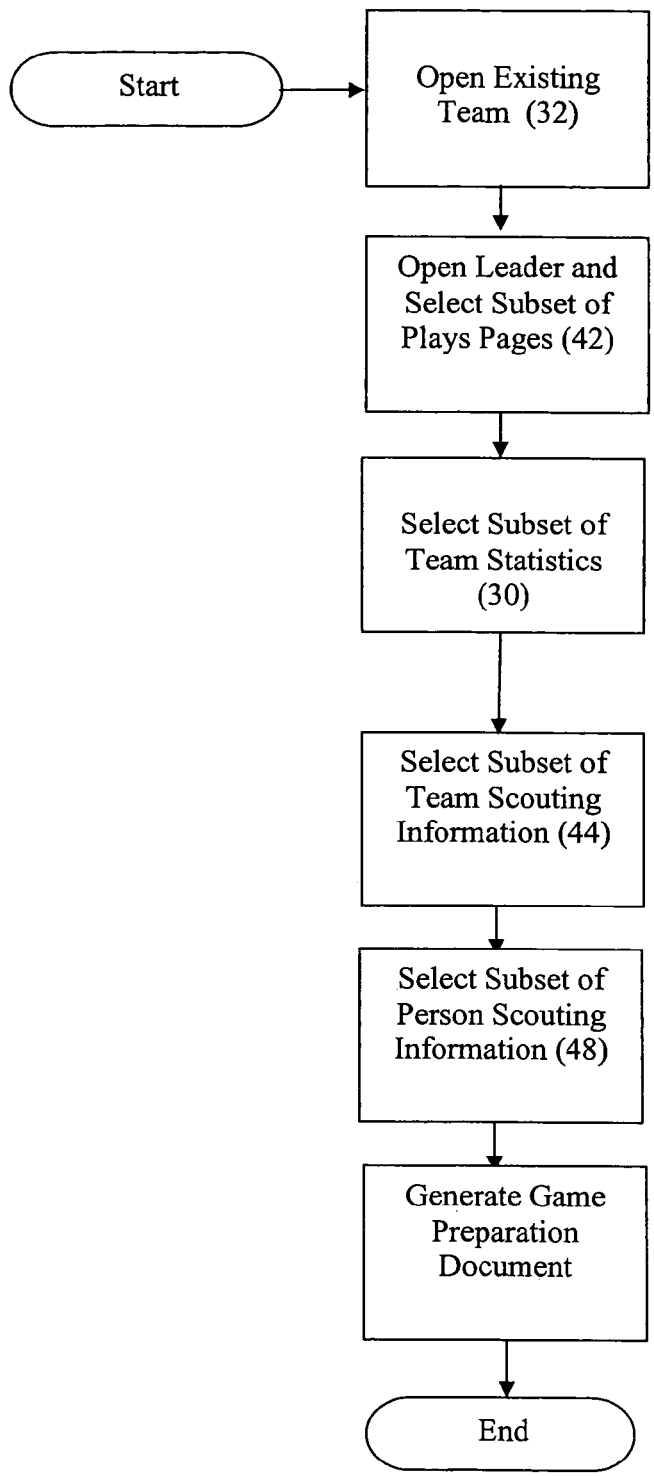
FIG. 9g is a further workflow diagram illustrating a user creating or modifying a game preparation summary (Game-Prep).
Figure 9H:
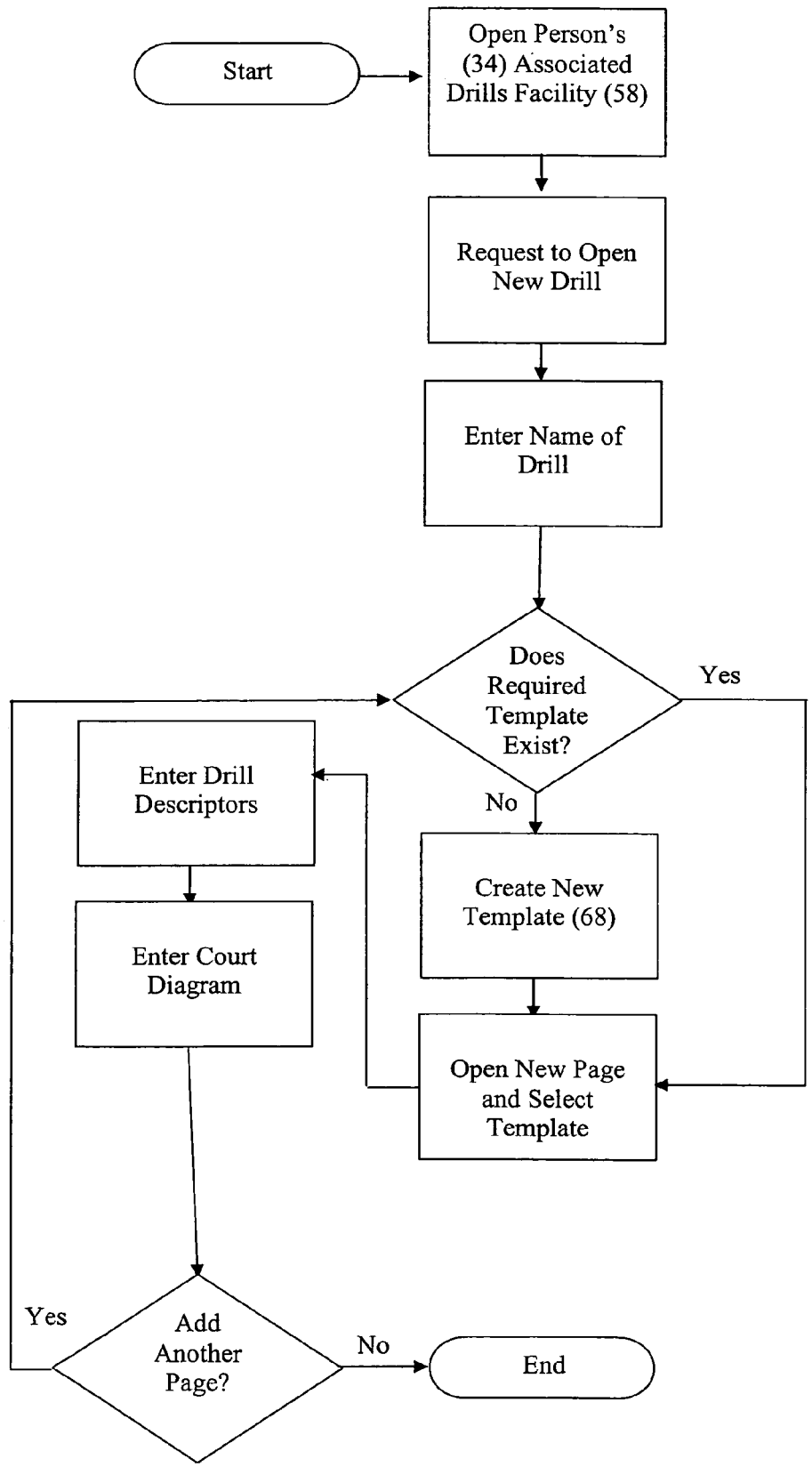
FIG. 9h is a further workflow diagram illustrating a user creating or modifying a drill.
Figure 9I:
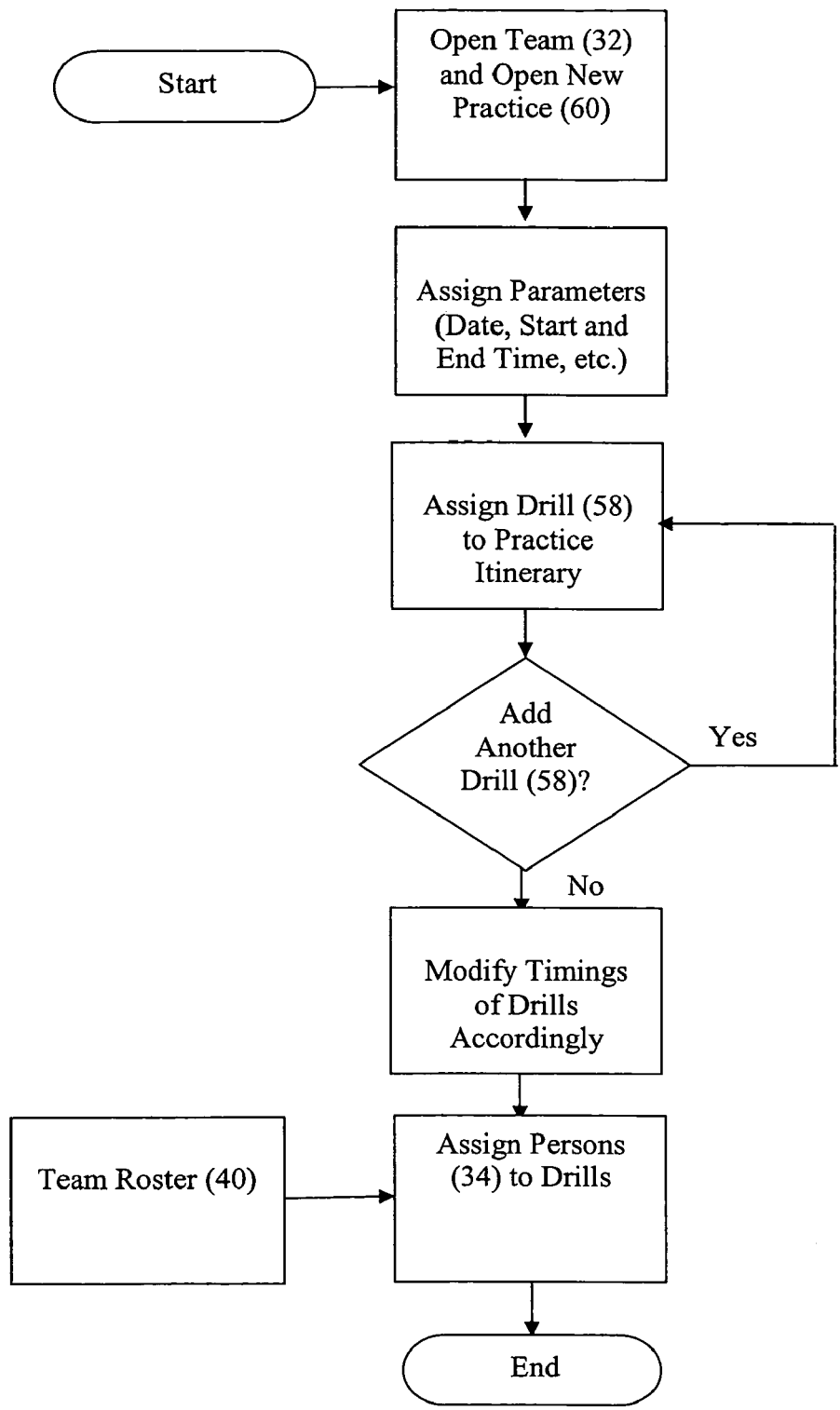
FIG. 9i is a further workflow diagram illustrating a user creating or modifying a practice itinerary.
Figure 9J:
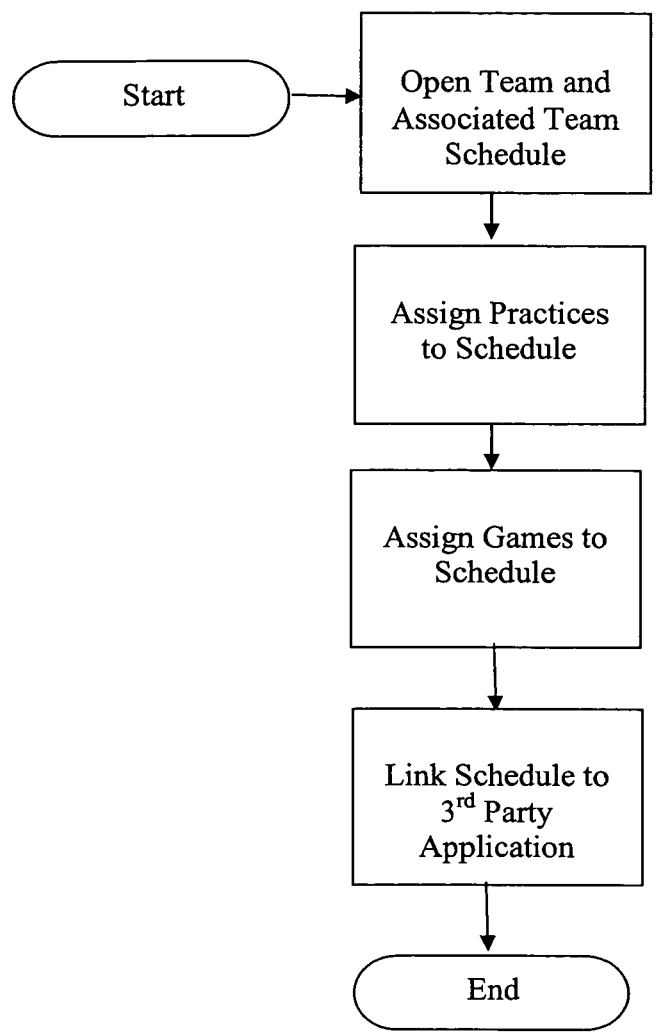
FIG. 9j is a further workflow diagram illustrating a user modifying a schedule for a team's season.
Figure 9K:
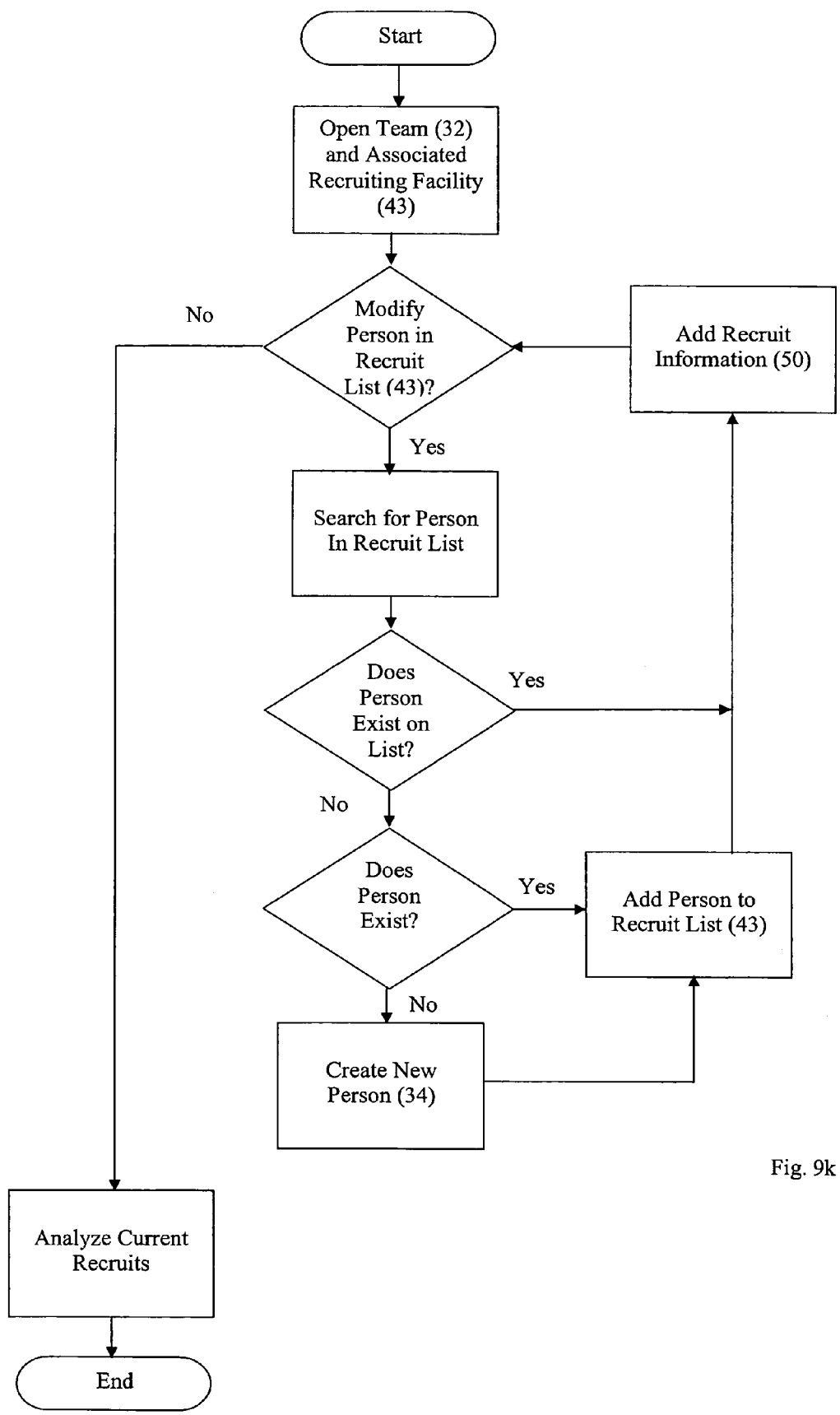
FIG. 9k is a further workflow diagram illustrating a user creating or modifying a recruiting list.
Figure 91:
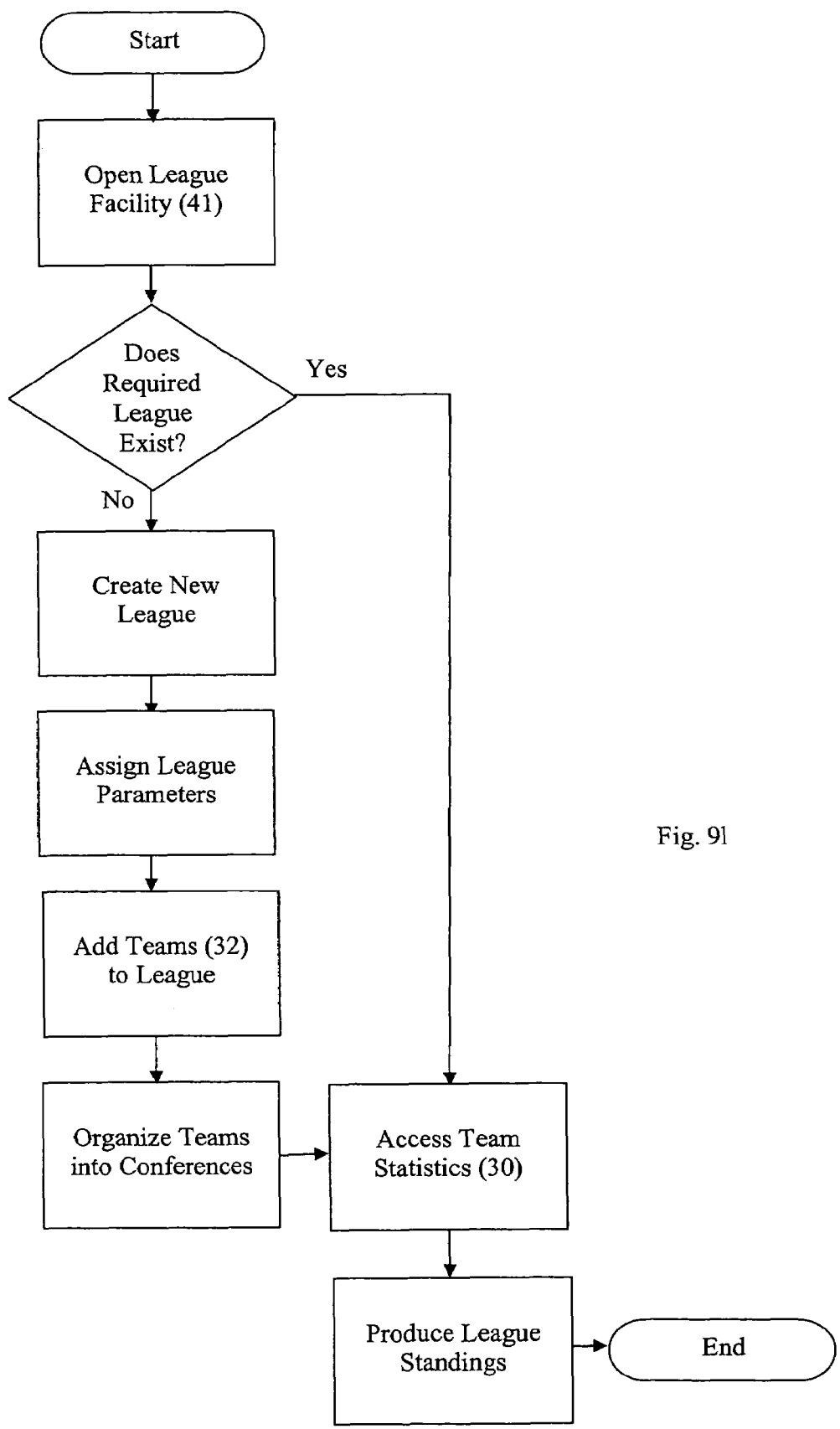
Figure 9M:
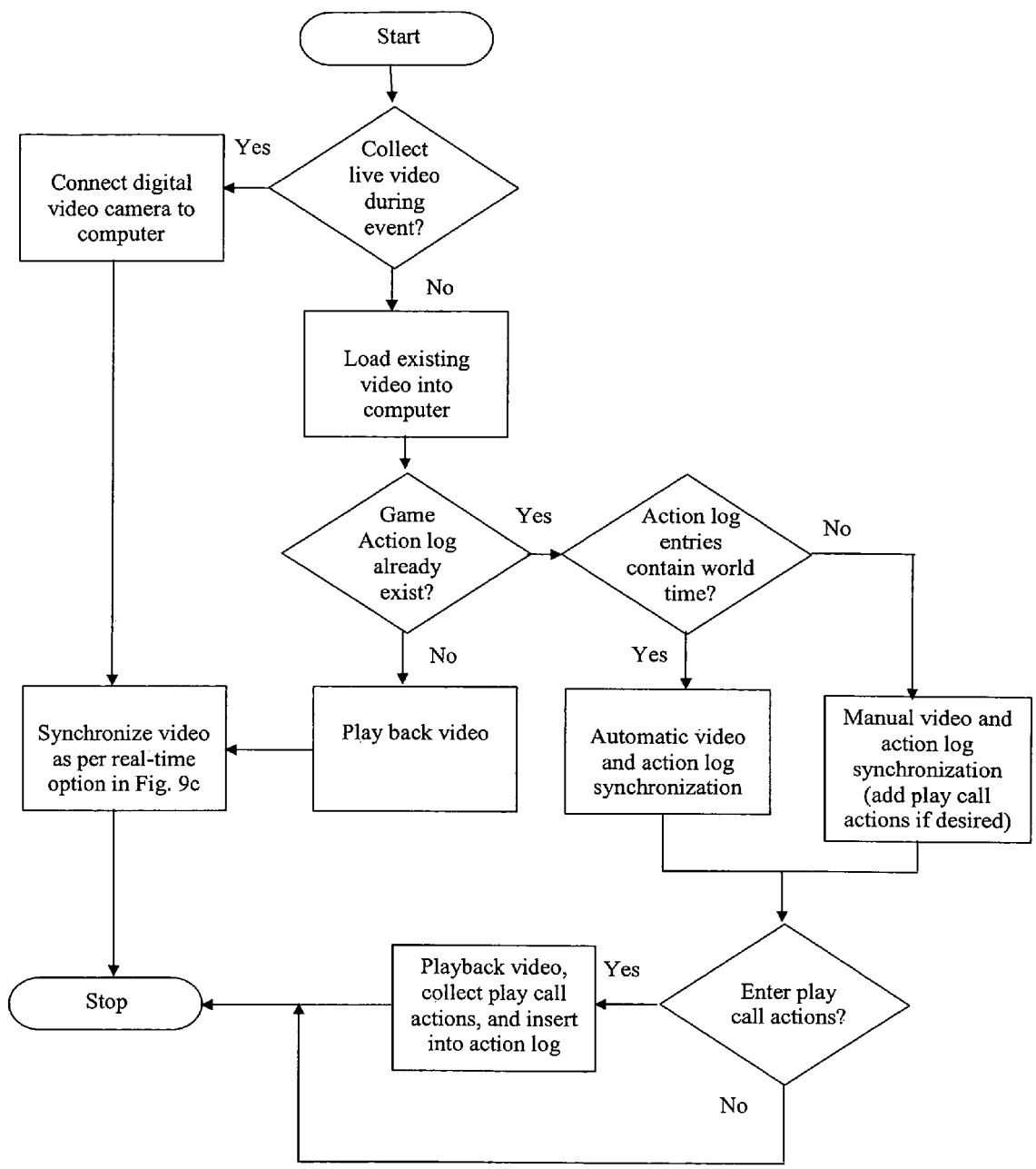
FIG. 9m is a further workflow diagram illustrating a user synchronizing digital video with collected actions.

As previously stated, FIGS. 9a-9l illustrate particular aspects of the method of the present invention. FIG. 9a illustrates a user either creating a new person or modifying an existing person already found in the database. In FIG. 9b shows a user creating a new team or modifying an existing team already found in the database. In FIG. 9c shows a user entering game actions for a particular game. FIG. 9d depicts a user viewing a person statistics. FIG. 9e shows the user viewing team statistics. In FIG. 9f, the method of a user entering diagrammed plays and accompanying notes on the plays is shown. FIG. 9g depicts a user creating or modifying a game preparation summary. FIG. 9h shows a user creating or modifying a drill in an aspect of the invention. FIG. 9i shows a user creating or modifying a practice itinerary. FIG. 9j illustrates a user modifying a schedule for a team's season. FIG. 9k demonstrates how a user creates or modifies a recruiting list in accordance with a particular aspect of the method of the invention. FIG. 9l shows a user creating or modifying a league, in accordance with the method. FIG. 9m demonstrates how a user would synchronize digital video with actions.

It should be expressly understood that all reference to basketball herein refers to one particular sports embodiment and is meant as an example only and is not intended to limit the scope of the present invention. The present invention contemplates applications in various and numerous other sports, activities and other events, where capture of events in real time is desirable, as well as subsequent analysis of the event. Other variations and modifications of the invention are possible. All such modifications or variations are believed to be within the sphere and scope of the invention as defined by the claims appended hereto.

What is claimed is:

1. A method of collecting data associated with a sequence of scenes that are related to an event, the method comprising:
 (a) providing a digital processing system linked to a digital input device, the digital processing system being operable to receive data associated with the sequence of scenes;
 (b) receiving as input from the digital input device one of more markings, the markings corresponding to predetermined coded data entries, the coded data entries defining one or more parameters of the scenes;
 (c) recognizing the markings by operation of handwriting recognition functionality of the digital processing system, and interpreting the coded data entries so as to define data regarding the sequence of scenes; and
 (d) interpreting and compiling the coded data entries so as to define by operation of the digital processing system an event recording that includes the parameters of the sequence of scenes.

2. The method of claim 1 wherein the markings are received within an area of a graphic user interface while viewing the event, the graphic user interface provided by the digital processing system.

3. The method of claim 2 further comprising deleting the oldest coded data entries on the graphic user interface so that a maximum number of data entry codes appear in the coded data entry area at any given time.

4. The method of claim 2 wherein the digital processing system is linked to a camera to enable video playback on the graphic user interface.

5. The method of claim 2 wherein the digital processing system comprises a video facility operable to display on the graphic user interface desired video clips.

6. The method of claim 1 wherein the digital input device comprises a digital pen and a tablet computer with a touch screen.

7. The method of claim 1 wherein the coded data entries are handwritten and comprise letters, numbers, symbols or drawing strokes, or any combination thereof.

8. The method of claim 1 wherein the coded data entries are associated with an event time.

9. The method of claim 1 further comprising verifying the interpretation of the coded data entries in an action log area of a graphic user interface.

10. The method of claim 1 wherein the digital processing system is linked to one or more other digital processing systems, with each system compiling interpreted coded data entries so as to define multiple event recordings of the event.

11. The method of claim 1 wherein the digital processing systems comprises a statistical facility operable to generate and store statistics from the event recording of the event.

12. The method of claim 11 wherein the statistical facility is operable to display statistics within a statistics area of the graphical user interface.

13. A portable digital system for collecting data associated with a sequence of scenes, the scenes being related to an event, the portable digital system comprising:
 (a) a digital processor;
 (b) a digital pen linked to the digital processor, the digital processor being operable to receive input from the digital pen; and
 (c) a computer application being operable on the digital processor to:
  (i) enable the recognition of handwritten characters marked by operation of the digital pen;
  (ii) define a series of coded data entries defining parameters of the sequence of scenes;
  (iii) receive the handwritten characters corresponding to the coded data entries; and
  (iv) interpret and compile the coded data entries so as to define by operation of the digital processor an event recording that includes the parameters of the sequence of scenes.

14. The portable digital system of claim 13 whereby the computer application defines a graphic user interface and displays the coded data entries in an area of the graphic user interface.

15. The portable digital system of claim 14 further comprising a video facility operable to store video clips synchronized with the coded data entries and event time information stored to the statistical facility, the video facility operable to extract desired video clips and display the desired video clips on an area of the graphic user interface.

16. The portable digital system of claim 13 wherein the digital processor is linked to one or more other digital processing systems, with each system compiling interpreted coded data entries so as to define multiple event recordings of the event.

17. The portable digital system of claim 13 wherein the coded data entries are associated with an event time and stored to a statistical facility.

18. A computer program product for use in association with a digital pen and a tablet computer to enable data to be collected associated with a sequence of scenes, the computer program product comprising:
  (a) a computer usable medium;
  (b) computer readable program code recorded or storable in the computer usable medium, the computer readable program code defining an application that is operable to:
   (i) enable recognition of handwritten characters marked by operation of the digital pen and the tablet computer;
   (ii) define coded data entries defining parameters of the sequence of scenes;
   (iii) define a graphic user interface, the graphic user interface including:
     (A) a coded data entry area for receiving the handwritten characters corresponding to the coded data entries; and
     (B) an action log area;
   (iv) display the coded data entries based on handwriting recognition of the handwritten characters in the action log area, and delete in sequence the earliest provided handwritten characters from the coded data entry area and the action log area; and
   (v) interpret and compile the coded data entries so as to define an event recording that includes the parameters of the sequence of scenes.

19. The computer program product of claim 18 wherein the coded data entries are associated with an event time and stored to a statistical facility.

20. The computer program product of claim 18 further comprising a video facility operable to store video clips synchronized with the coded data entries and event time information stored to the statistical facility, the video facility operable to extract desired video clips and display the desired video clips on an area of the graphic user interface.

* * * * *